US012003066B1

(12) United States Patent
Thiel et al.

(10) Patent No.: US 12,003,066 B1
(45) Date of Patent: Jun. 4, 2024

(54) UNIVERSAL DC POWER ADAPTOR

(71) Applicant: LAT Enterprises, Inc., Raleigh, NC (US)

(72) Inventors: Laura Thiel, Raleigh, NC (US); Giancarlo Urzi, Raleigh, NC (US); Carlos Cid, Raleigh, NC (US)

(73) Assignee: LAT Enterprises, Inc., Raleigh, NC (US)

( * ) Notice: Subject to any disclaimer, the term of this patent is extended or adjusted under 35 U.S.C. 154(b) by 0 days.

(21) Appl. No.: 18/232,093

(22) Filed: Aug. 9, 2023

Related U.S. Application Data

(63) Continuation of application No. 17/238,917, filed on Apr. 23, 2021, now Pat. No. 11,728,600, which is a
(Continued)

(51) Int. Cl.
*H01R 31/06* (2006.01)
*H01R 13/629* (2006.01)
(Continued)

(52) U.S. Cl.
CPC ......... *H01R 31/065* (2013.01); *H01R 13/629* (2013.01); *H01R 13/639* (2013.01); *H01R 13/719* (2013.01); *H02J 7/00309* (2020.01); *H02J 7/0048* (2020.01); *H01R 13/24* (2013.01); *H01R 13/2407* (2013.01); *H01R 13/2421* (2013.01); *H01R 13/62* (2013.01); *H01R 13/62977* (2013.01); *H01R 13/64* (2013.01); *H01R 31/06* (2013.01); *H01R 2201/24* (2013.01); *H02J 7/00* (2013.01);
(Continued)

(58) Field of Classification Search
CPC .. H01R 31/065; H01R 13/629; H01R 13/639; H01R 13/719; H01R 13/24; H01R 13/2407; H01R 13/2421; H01R 13/62; H01R 13/62977; H01R 13/64; H01R 31/06; H01R 2201/24; H02J 7/00309; H02J 7/0048; H02J 7/00; H02J 7/0047; H02J 2207/10; H02J 2207/30
See application file for complete search history.

(56) References Cited

U.S. PATENT DOCUMENTS 3,825,999 A 7/1974 Rubey
4,714,439 A 12/1987 Marabotto et al.
(Continued)

*Primary Examiner* — Abdullah A Riyami
*Assistant Examiner* — Justin M Kratt
(74) *Attorney, Agent, or Firm* — NEO IP

(57) ABSTRACT

A universal DC power adaptor for a PRC-148 radio, a PRC-152 radio, a Handheld ISR Transceiver, and similar devices and a method of using the same, is disclosed. The universal DC power adaptor includes mounting and locking features that are common to both the PRC-148 radio and the PRC-152 radio. The universal DC power adaptor further includes certain mounting and locking features that are unique to the PRC-148 radio and other mounting and locking features that are unique to the PRC-152 radio. The universal DC power adaptor also provides an output voltage suitable for both the PRC-148 and PRC-152 radios. Such features also are compatible with the Handheld ISR Transceiver, making the universal DC power adaptor compatible with the ISR Transceiver as well. Additionally, the universal DC power adaptor includes programmable control electronics.

20 Claims, 31 Drawing Sheets

Related U.S. Application Data continuation of application No. 17/247,250, filed on Dec. 4, 2020, now Pat. No. 10,992,094.

(51) Int. Cl.
  *H01R 13/639*  (2006.01)
  *H01R 13/719*  (2011.01)
  *H02J 7/00*    (2006.01)
  *H01R 13/24*   (2006.01)
  *H01R 13/62*   (2006.01)
  *H01R 13/64*   (2006.01)

(52) U.S. Cl.
  CPC ......... *H02J 7/0047* (2013.01); *H02J 2207/10* (2020.01); *H02J 2207/30* (2020.01)

(56) References Cited

U.S. PATENT DOCUMENTS

| | | | |
|---|---|---|---|
| 8,232,769 B2 * | 7/2012 | Paczkowski | H01M 10/44 |
| | | | 324/426 |
| 9,240,651 B2 * | 1/2016 | Thiel | H01R 13/62977 |
| 9,780,344 B2 | 10/2017 | Thiel et al. | |
| 2018/0062197 A1 | 3/2018 | Thiel et al. | |

* cited by examiner (TOP)

SECTION A-A (SIDE)

(END)

(BOTTOM)

SECTION B-B

DETAIL C
SCALE 10 : 1

UNIVERSAL DC POWER ADAPTOR

CROSS REFERENCES TO RELATED APPLICATIONS

This application is related to and claims priority from the following U.S. patents and patent applications. This application is a continuation of U.S. application Ser. No. 17/238,917, filed Apr. 23, 2021, which is a continuation of U.S. application Ser. No. 17/247,250, filed Dec. 4, 2020, each which is incorporated herein by reference in its entirety.

BACKGROUND OF THE INVENTION

1. Field of the Invention

The present invention relates generally to direct current (DC) power adaptors and, more particularly, to a universal DC power adaptor for a Handheld Intelligence, Surveillance, and Reconnaissance (ISR) Transceiver, a PRC-148 radio, and a PRC-152 radio, and a method of using same.

2. Description of the Prior Art

It is generally known in the prior part to provide systems and methods of providing DC power.

Prior art patent documents including the following:

U.S. Pat. No. 3,825,999 for method of connecting electrical component by inventor Rubey, filed Dec. 26, 1972 and issued Jul. 30, 1974, is directed to a circuit board employing solder pads plated onto the reverse side of an insulative board in an orthogonal array and connected to aligned conductive areas on the obverse side by plated-through holes. Wire guides including upstanding fingers mount on the reverse side of the board with conductive pins from electrical components extending through the holes in the board from the obverse side to the reverse side. Insulated wire is threaded around the pins of the electrical components and guide in accordance with a predetermined pattern of component interconnections. For interconnections between points on the board, wire is threaded substantially orthogonally. Where wire is to be severed, it is threaded angularly relative to the orthogonal array. After wire threading, the wire is selectively soldered to contact areas while evaporating locally the insulation thereon and component pins are soldered in plated-through holes. All angularly arrayed segments of the wire are cut and loose portions removed leaving only wire segments which form desired interconnections.

U.S. Pat. No. 4,714,439 for electrical connector by inventors Marabotto, et al., filed Jul. 3, 1986 and issued Dec. 22, 1987, is directed to an electrical connector for making electrical connection to a mating connector. The connector includes a body portion that has a substantially cylindrical cavity. A contact block is located in the cavity and carries three contacts. A spring engages the contact block for applying biasing force to the contact block and contacts for providing electrical connection of the contacts to the mating connector. A peripheral resilient seal is located above the contact block and provides a seal between the contact block and a cylindrical cavity. The peripheral seal includes a bead portion that engages the mating connector for providing a water seal about the contacts.

U.S. Pat. No. 8,232,769 for passive battery discharge device by inventor Paczkowski, filed Jun. 19, 2009 and issued Jul. 31, 2012, is directed to a passive battery discharge apparatus located within a cap. The cap extends over battery contacts to be discharged. The discharge apparatus includes a conductive material with specified volumetric resistivity properties that is formed into a pad. The cap is positioned over the contacts so that the pad touches and spans between the contacts to be discharged. A spring insures good contact between the pad and the battery contacts. A metal heat sink provides added thermal control. The discharge apparatus provides an economical solution to safely transport batteries that are beyond their useful service life by avoiding circuit components in favor of conductive elastomers or conductive foams.

U.S. Pat. No. 9,240,651 for universal DC power adaptor by inventor Thiel, filed Jan. 28, 2014 and issued Jan. 19, 2016, is directed to a universal DC power adaptor for a PRC-148 radio, a PRC-152 radio, and a Handheld ISR Transceiver, and a method of using same, is disclosed. The universal DC power adaptor includes mounting and locking features that are common to both the PRC-148 radio and the PRC-152 radio. The universal DC power adaptor further includes certain mounting and locking features that are unique to the PRC-148 radio and other mounting and locking features that are unique to the PRC-152 radio. The universal DC power adaptor also provides an output voltage suitable for both the PRC-148 and PRC-152 radios. Such features also are compatible with the Handheld ISR Transceiver, making the universal DC power adaptor compatible with the ISR Transceiver as well. Additionally, the universal DC power adaptor includes programmable control electronics.

SUMMARY OF THE INVENTION

The present invention relates to a universal DC power adaptor.

It is an object of this invention to provide a DC power adaptor that works for a plurality of electrical devices, particularly, electrical devices used in military operations.

In one embodiment, the present invention includes a direct current (DC) power adaptor including an adaptor plate assembly, an adaptor housing, and a layer of heat-shielding or blocking, heat-dissipating and/or heat signature-reducing material, wherein the adaptor plate assembly includes an adaptor plate, at least one alignment component, at least one input connector, and at least one voltage pin, wherein the adaptor plate assembly is mounted to the adaptor housing, wherein the adaptor plate assembly is configured to receive a radio, wherein the adaptor housing includes control electronics, wherein the control electronics include a printed circuit board (PCB), and wherein the PCB is electrically connected to the at least one voltage pin, wherein the PCB is electrically connected to the at least one input connector via at least one cable, wherein the at least one input connector is configured to connect to a DC power source, and wherein the layer of heat-shielding or blocking, heat-dissipating and/or heat signature-reducing material is functionally positioned between the adaptor plate assembly and the control electronics.

In another embodiment, the present invention includes a direct current (DC) power adaptor including an adaptor plate assembly, an adaptor housing, and a layer of heat-shielding or blocking, heat-dissipating and/or heat signature-reducing material, wherein the adaptor plate assembly includes an adaptor plate, at least one alignment component, at least one input connector, and at least one voltage pin, wherein the adaptor plate assembly is mounted to the adaptor housing, wherein the adaptor plate assembly is configured to receive a radio, wherein the at least one alignment component is a mating plate, wherein the mating plate is configured to mate with a corresponding component on the radio, wherein the adaptor housing includes control electronics, wherein the control electronics include a printed circuit board (PCB) and a power conditioning module, and wherein the PCB is electrically connected to the at least one voltage pin, wherein the PCB is electrically connected to the at least one input connector via at least one cable, wherein the power conditioning module is configured to receive an input voltage, and wherein the power conditioning module is further configured to supply an output voltage, wherein the at least one input connector is configured to connect to a DC power source, and wherein the layer of heat-shielding or blocking, heat-dissipating and/or heat signature-reducing material is functionally positioned between the adaptor plate assembly and the control electronics.

In yet another embodiment, the present invention includes a direct current (DC) power adaptor including an adaptor plate assembly, an adaptor housing, and a layer of heat-shielding or blocking, heat-dissipating and/or heat signature-reducing material, wherein the adaptor plate assembly includes an adaptor plate, at least one alignment component, at least one input connector, and at least one voltage pin, wherein the adaptor plate assembly is mounted to the adaptor housing, wherein the adaptor plate assembly is configured to receive a radio, wherein the at least one alignment component is a mating plate, wherein the mating plate is configured to mate with a corresponding component on the radio, wherein the adaptor housing includes control electronics, wherein the control electronics include a printed circuit board (PCB), a voltage sensing circuit, and a communications interface, and wherein the PCB is electrically connected to the at least one voltage pin, wherein the PCB is electrically connected to the at least one input connector via at least one cable, wherein the at least one input connector is configured to connect to a DC power source, wherein the communications interface is configured to communicate information related to a state of charge (SOC) of the DC power source to a network, and wherein the layer of heat-shielding or blocking, heat-dissipating and/or heat signature-reducing material is functionally positioned between the adaptor plate assembly and the control electronics.

These and other aspects of the present invention will become apparent to those skilled in the art after a reading of the following description of the preferred embodiment when considered with the drawings, as they support the claimed invention.

DETAILED DESCRIPTION

Figure 1:
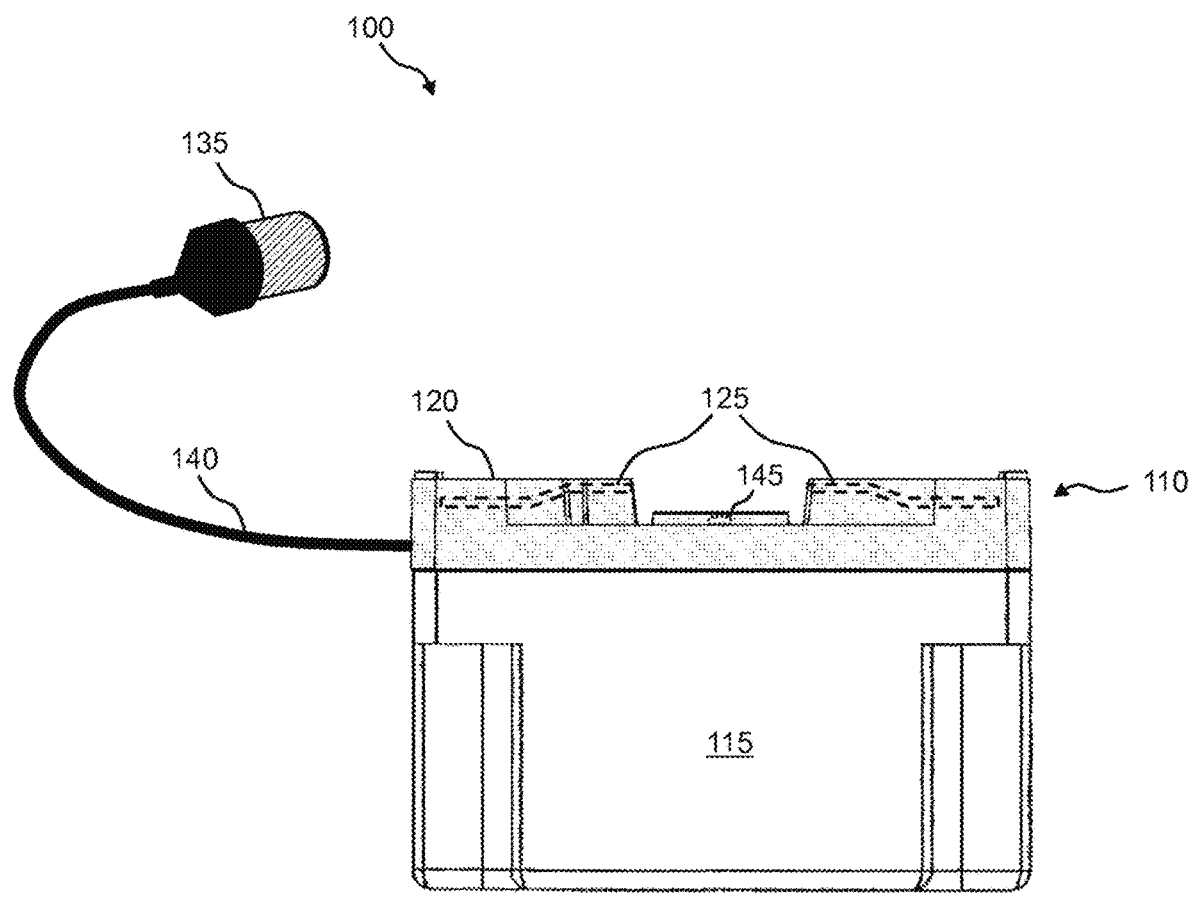
FIG. 1 illustrates a side view of a universal DC power adaptor for the Handheld ISR Transceiver, PRC-148 radio, and PRC-152 radio according to one embodiment of the present invention.

The present invention is generally directed to a universal DC power adaptor.

In one embodiment, the present invention includes a direct current (DC) power adaptor including an adaptor plate assembly, an adaptor housing, and a layer of heat-shielding or blocking, heat-dissipating and/or heat signature-reducing material, wherein the adaptor plate assembly includes an adaptor plate, at least one alignment component, at least one input connector, and at least one voltage pin, wherein the adaptor plate assembly is mounted to the adaptor housing, wherein the adaptor plate assembly is configured to receive a radio, wherein the adaptor housing includes control electronics, wherein the control electronics include a printed circuit board (PCB), and wherein the PCB is electrically connected to the at least one voltage pin, wherein the PCB is electrically connected to the at least one input connector via at least one cable, wherein the at least one input connector is configured to connect to a DC power source, and wherein the layer of heat-shielding or blocking, heat-dissipating and/or heat signature-reducing material is functionally positioned between the adaptor plate assembly and the control electronics.

In another embodiment, the present invention includes a direct current (DC) power adaptor including an adaptor plate assembly, an adaptor housing, and a layer of heat-shielding or blocking, heat-dissipating and/or heat signature-reducing material, wherein the adaptor plate assembly includes an adaptor plate, at least one alignment component, at least one input connector, and at least one voltage pin, wherein the adaptor plate assembly is mounted to the adaptor housing, wherein the adaptor plate assembly is configured to receive a radio, wherein the at least one alignment component is a mating plate, wherein the mating plate is configured to mate with a corresponding component on the radio, wherein the adaptor housing includes control electronics, wherein the control electronics include a printed circuit board (PCB) and a power conditioning module, and wherein the PCB is electrically connected to the at least one voltage pin, wherein the PCB is electrically connected to the at least one input connector via at least one cable, wherein the power conditioning module is configured to receive an input voltage, and wherein the power conditioning module is further configured to supply an output voltage, wherein the at least one input connector is configured to connect to a DC power source, and wherein the layer of heat-shielding or blocking, heat-dissipating and/or heat signature-reducing material is functionally positioned between the adaptor plate assembly and the control electronics.

In yet another embodiment, the present invention includes a direct current (DC) power adaptor including an adaptor plate assembly, an adaptor housing, and a layer of heat-shielding or blocking, heat-dissipating and/or heat signature-reducing material, wherein the adaptor plate assembly includes an adaptor plate, at least one alignment component, at least one input connector, and at least one voltage pin, wherein the adaptor plate assembly is mounted to the adaptor housing, wherein the adaptor plate assembly is configured to receive a radio, wherein the at least one alignment component is a mating plate, wherein the mating plate is configured to mate with a corresponding component on the radio, wherein the adaptor housing includes control electronics, wherein the control electronics include a printed circuit board (PCB), a voltage sensing circuit, and a communications interface, and wherein the PCB is electrically connected to the at least one voltage pin, wherein the PCB is electrically connected to the at least one input connector via at least one cable, wherein the at least one input connector is configured to connect to a DC power source, wherein the communications interface is configured to communicate information related to a state of charge of the DC power source to a network, and wherein the layer of heat-shielding or blocking, heat-dissipating and/or heat signature-reducing material is functionally positioned between the adaptor plate assembly and the control electronics.

The military uses various types of portable battery-operated radios and handheld digital devices for reconnaissance. The Handheld ISR Transceiver, such as those manufactured by, for example, L3 Communications, Raytheon Company, Harris Corporation, and Coastal Defense, Inc., is one example of such handheld digital devices. The PRC-148 radio and the PRC-152 radio are examples of military-spec portable battery-operated radios. The battery for the PRC-148 has certain unique features for mounting and locking the base of the radio to the battery. The battery for the PRC-152 has certain other unique features for mounting and locking the base of the radio to the battery. The battery for the Handheld ISR Transceiver has certain other unique features for mounting and locking the base of the device to the battery.

There are many circumstances in which it may be beneficial to replace the battery of either type of radio, or the Handheld ISR Transceiver, with a DC power adaptor. The PRC-148 radio requires a battery having a first set of features and providing a first output voltage range. Similarly, the PRC-152 radio requires a battery having a second set of features and providing a second output voltage range. Further still, the Handheld ISR Transceiver would requires a battery having a third set of features and providing a third output voltage range. As the first output voltage range, the second output voltage range, and the third output voltage range all overlap, military personnel interchange these batteries when possible. However, these batteries generally provide a battery to device mismatch. For example, the PRC-152 radio has an operating voltage range of 10V to 14.5V. The battery often used to power the PRC-152 radio has an output voltage range of 8V to 12.6V. Because the radio cannot operate at voltage lower than 10V, the battery used to power the radio only has a functional output voltage range of 10V to 12.6V. Thus, the whole charge capacity of the battery is not usable, resulting in a reduced weight to run time ratio. Therefore, military personnel are required to carry additional batteries, which increases the carrying load of the military personnel. Soldiers often carry 60-100 lbs. of gear in their rucksack or attached to their vest. Additional weight slows soldiers down and also makes it more likely that they will suffer injuries to their body (e.g., injuries to the back, shoulders, hips, knees, ankles, and feet). Advantageously, the present invention provides a significantly increased weight to run time ratio because the whole battery charge capacity of the external DC power source is available to power the radio. Further, changing the batteries more frequently is time consuming, and requires stopping communications, switching the battery, and restarting communications. This process is dangerous for the entire team because communications are interrupted.

Another problem with DC power adaptors used with radios is high frequency interference. This can result from wires with a nylon sheath and no shielding. The wires with the nylon sheath and no shielding act similarly to an antenna, thereby creating high frequency interference. Generally, a radio operator has a dual communications system with a first radio (e.g., to communicate with a first group), a second radio (e.g., to communicate with a second group), and a headset connected to the first radio and the second radio. The dual communications system creates a circuit between the first radio, the headset, the second radio, and the battery used to power the first radio and the second radio that interferes with performance of the dual communications system because the circuit creates an unintended antenna. Due to the circuit created, the radio operator experiences interference in audio between the radios, whereas typically the audio would be separated. This causes an issue with communications that can negatively affect a military operation. Unshielded wires with a nylon sheath or an improperly shielded cable also create interference. Therefore, there is a need to prevent radio interference during military operations.

Another issue faced by radio operators is that some radios are configured to zero out if they are out of power for longer than a set time period (e.g., 15 minutes). Most radios include a Hold Up Battery (HUB) battery operable to sustain secure programming on the radio for the set time period to prevent the radio from zeroing out. The HUB battery has a fixed lifetime (e.g., 50 hours), and the HUB battery may reach the fixed lifetime without the operator being alerted. If a radio is zeroed out, then the radio must be reprogrammed (e.g., by the manufacturer) and/or data must be redownloaded to the radio. This is a problem if a radio operator is in a hostile environment and loses access to critical information. Thus, there is a need for a power adaptor operable to provide power to a radio using alternative power sources (e.g., rechargeable battery) if a battery is too low to power the radio or is otherwise malfunctioning. Advantageously, the universal DC power adaptor protects the radio from zeroing out even if the HUB battery dies.

In some aspects, the present invention provides a universal DC power adaptor for coupling one of a Handheld ISR Transceiver, a PRC-148 radio, a PRC-152 radio (e.g., a PRC-152A), a PRC-161 radio, a PRC-163 radio, a SADL MicroLite (RT-1922) radio, a TacRover-E (TRE) radio, a Tactical ROVER-P (SIR 2.5) radio, a Coastal Defense MVR-IV video down link receiver, and/or a Persistent Systems Wave Relay MPU5 radio to an external DC power source. In a preferred embodiment, the external DC power source is remoted away from the radio. Advantageously, this allows the radio to be powered by a larger DC power source (e.g., battery) with a greater capacity, and therefore increasing the overall run time. This also provides greater ergonomic comfort, as the operator is able to carry a larger weight and a larger size not on a front side of the body (e.g., in a rucksack, in a pouch positioned on a back side of the body). Additionally, some radios (e.g., PRC-152, PRC-163) have an antenna that is positioned close to an operator's face when worn on the front of the body. Further, some radios require more than one antenna (e.g., MPU-5), which are positioned close to an operator's face when worn on the front of the body. The universal DC power adaptor has a lower height than a battery, which advantageously prevents the antenna from hitting the operator in the face.

In one embodiment, the universal DC power adaptor includes an adaptor housing and an adaptor plate assembly mounted to the adaptor housing. The adaptor plate assembly further includes an adaptor plate, a pair of mating plates, and at least one alignment component. The universal DC power adaptor further includes a printed circuit board (PCB) and an input connector electrically coupled to the printed circuit board. In one embodiment, the printed circuit board includes control electronics. In one embodiment, the PCB is electrically connected to the output voltage pins via at least one wire. In one embodiment, the pair of mating plates and at least one alignment component are affixed to the top surface of the adaptor plate and are configured to substantially align with corresponding features of the Handheld ISR Transceiver, the PRC-148 radio, the PRC-152 radio, the PRC-161 radio, the PRC-163 radio, the SADL MicroLite (RT-1922) radio, the TacRover-E (TRE) radio, the Tactical ROVER-P (SIR 2.5) radio, the Coastal Defense MVR-IV video down link receiver, and/or the Persistent Systems Wave Relay MPU5 radio such that any of the devices are operable to twist and lock into the adaptor plate assembly, thereby mechanically coupling the device to the power adaptor and electrically coupling the device to the output voltage pins. The input connector is configured to couple to any number of external power sources, including non-rechargeable batteries, rechargeable batteries, or other types of DC power sources.

In another embodiment, the power adaptor includes at least one side locking feature and/or at least one hole or detent. The at least one locking feature is operable to engage with the Handheld ISR Transceiver, the PRC-148 radio, the PRC-152 radio, the PRC-161 radio, the PRC-163 radio, the SADL MicroLite (RT-1922) radio, the TacRover-E (TRE) radio, the Tactical ROVER-P (SIR 2.5) radio, the Coastal Defense MVR-IV video down link receiver, and/or the Persistent Systems Wave Relay MPU5 radio to facilitate mechanical coupling.

In one embodiment, the control electronics include a controller and a power conditioning module. The power conditioning module is configured to receive a certain input voltage and output a second voltage falling within a range acceptable for each of the Handheld ISR Transceiver, the PRC-148 radio, the PRC-152 radio, the PRC-161 radio, the PRC-163 radio, the SADL MicroLite (RT-1922) radio, the TacRover-E (TRE) radio, the Tactical ROVER-P (SIR 2.5) radio, the Coastal Defense MVR-IV video down link receiver, and/or the Persistent Systems Wave Relay MPU5 radio. In one embodiment, the control electronics further include a wired input/output port or a wired or wireless communications interface configured to facilitate programming of the controller and/or the power conditioning module. In one embodiment, the power conditioning module includes a DC-DC converter.

Another aspect of the universal DC power adaptor is that it includes control electronics that are programmable. The control electronics are operable to receive and send power control instructions. The universal DC power adaptor is operable receive different input voltages and still generate the required output voltage needed to satisfy the Handheld ISR Transceiver, the PRC-148 radio, the PRC-152 radio, the PRC-161 radio, the PRC-163 radio, the SADL MicroLite (RT-1922) radio, the TacRover-E (TRE) radio, the Tactical ROVER-P (SIR 2.5) radio, the Coastal Defense MVR-IV video down link receiver, and/or the Persistent Systems Wave Relay MPU5 radio based on the power control instructions.

In some embodiments, the present invention provides a universal DC power adaptor for a Handheld ISR Transceiver, a PRC-148 radio, a PRC-152 radio, a PRC-161 radio, a PRC-163 radio, a SADL MicroLite (RT-1922) radio, a TacRover-E (TRE) radio, a Tactical ROVER-P (SIR 2.5) radio, a Coastal Defense MVR-IV video down link receiver, and/or a Persistent Systems Wave Relay MPUS radio, and methods of using the same. The universal DC power adaptor allows the Handheld ISR Transceiver, the PRC-148 radio, the PRC-152 radio, the PRC-161 radio, the PRC-163 radio, the SADL MicroLite (RT-1922) radio, the TacRover-E (TRE) radio, the Tactical ROVER-P (SIR 2.5) radio, the Coastal Defense MVR-IV video down link receiver, and the Persistent Systems Wave Relay MPUS radio to be connected to an external DC power source (e.g., a remote external DC power source) instead of using their respective batteries. Namely, the universal DC power adaptor includes mounting and locking features that are common to each of the Handheld ISR Transceiver, the PRC-148 radio, the PRC-152 radio, the PRC-161 radio, the PRC-163 radio, the SADL MicroLite (RT-1922) radio, the TacRover-E (TRE) radio, the Tactical ROVER-P (SIR 2.5) radio, the Coastal Defense MVR-IV video down link receiver, and/or the Persistent Systems Wave Relay MPUS radio, and other similar devices. Additionally, the universal DC power adaptor includes mounting and locking features that are unique to the Handheld ISR Transceiver, while at the same time including mounting and locking features that are unique to the PRC-148 radio, while also at the same time including mounting and locking features that are unique to the PRC-152 radio.

Further, the output voltage and power of the universal DC power adaptor is suitable for each of the Handheld ISR Transceiver, the PRC-148 radio, the PRC-152 radio, the PRC-161 radio, the PRC-163 radio, the SADL MicroLite (RT-1922) radio, the TacRover-E (TRE) radio, the Tactical ROVER-P (SIR 2.5) radio, the Coastal Defense MVR-IV video down link receiver, and/or the Persistent Systems Wave Relay MPU5 radio. The universal DC power adaptor is operable to couple each of the Handheld ISR Transceiver, the PRC-148 radio, the PRC-152 radio, the PRC-161 radio, the PRC-163 radio, the SADL MicroLite (RT-1922) radio, the TacRover-E (TRE) radio, the Tactical ROVER-P (SIR 2.5) radio, the Coastal Defense MVR-IV video down link receiver, and/or the Persistent Systems Wave Relay MPU5 radio to an external DC power source (e.g., a remote external DC power source) in place of their respective batteries. The universal DC power adaptor is further operable to (1) accommodate different mechanical key mechanisms of the respective Handheld ISR Transceiver, PRC-148 radio, PRC-152 radio, PRC 161-radio, PRC-163 radio, SADL MicroLite (RT-1922) radio, TacRover-E (TRE) radio, Tactical ROVER-P (SIR 2.5) radio, Coastal Defense MVR-IV video down link receiver, and the Persistent Systems Wave Relay MPU5, and (2) accommodate different operating voltages of the respective Handheld ISR Transceiver, PRC-148 radio, PRC-152 radio, PRC-161 radio, PRC-163 radio, SADL MicroLite (RT-1922) radio, TacRover-E (TRE) radio, Tactical ROVER-P (SIR 2.5) radio, Coastal Defense MVR-IV video down link receiver, and the Persistent Systems Wave Relay MPU5.

Referring now to the drawings in general, the illustrations are for the purpose of describing one or more preferred embodiments of the invention and are not intended to limit the invention thereto.

Figure 2:
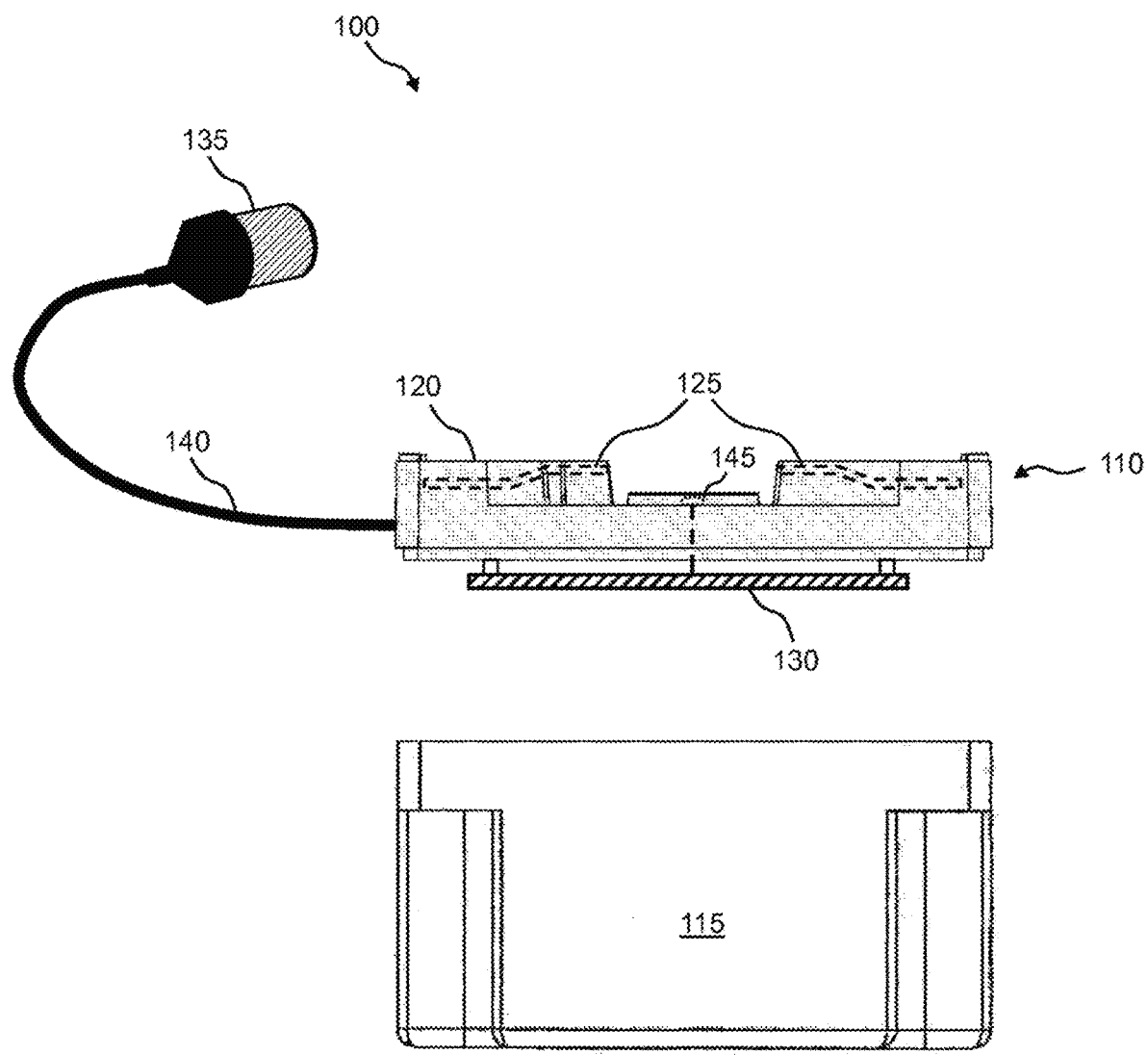
FIG. 2 illustrates one example of a side view of the universal DC power adaptor in a disassembled state.

FIG. 1 and FIG. 2 illustrate side views of an example of the universal DC power adaptor 100 for both the PRC-148 radio and the PRC-152 radio. FIG. 1 shows the universal DC power adaptor 100 in an assembled state. FIG. 2 shows one example the universal DC power adaptor 100 in a disassembled state. The universal DC power adaptor 100 includes an adaptor plate assembly 110 mounted on an adaptor housing 115. The adaptor housing 115 is formed of any rigid, durable, lightweight material, such as, but not limited to, molded plastic or metal (e.g., aluminum, stainless steel). In another embodiment, the adaptor housing includes aluminum. In one embodiment, the aluminum is machined.

In one embodiment, the adaptor plate assembly 110 is formed of a polymer. Generally, prior art DC adaptors are often formed of plastic and have issues with melting from heat generated by radios. In one embodiment, the polymer has a melting point of at least 500° F. In another embodiment, the polymer has a melting point of at least 400° F. Advantageously, the higher melting point of the polymer prevents heat from the radio from melting the universal DC power adaptor. In one embodiment, the adaptor plate assembly includes an acrylonitrile butadiene styrene (ABS) material. In one embodiment, the adaptor plate assembly is formed of a glass fiber reinforced resin. In one embodiment, the glass fiber reinforced resin is a heat stabilized, black polyamide 66 resin. In one embodiment, the glass fiber is ZYTEL® 70G33L NC010. In another embodiment, the adaptor plate assembly is configured to have a stress breaking point of about 200 MPa, a strain at break of about 3.5%, a flexural modulus of about 9300 MPa, a flexural strength of about 290 MPa, and/or a tensile modulus of about 10,500 MPa.

In one embodiment, the adaptor plate assembly 110 includes an adaptor plate 120, a pair of mating plates 125 (e.g., mating plates 125a and 125b), a printed circuit board (PCB) 130, and an input connector 135 that is electrically coupled to the PCB 130. In another embodiment, the PCB includes control electronics. The PCB 130 further is electrically connected to a set of voltage output pins 145 (see FIG. 3 and FIG. 4). In one embodiment, the PCB 130 is electrically connected to the voltage output pins 145 via at least one wire (not shown). In yet another embodiment, the present invention includes a flexible wire or cable 140 that is operable to electrically couple the input connector 135 to the PCB 130. In a preferred embodiment, the flexible wire or cable 140 includes a ferrite collar.

The adaptor plate 120 is formed of any rigid, durable, lightweight material, such as, but not limited to, molded plastic or metal (e.g., aluminum). The mating plates 125 are formed of any rigid, durable, lightweight material, such as, but not limited to, metal (e.g., aluminum, stainless steel, gold). The mating plates 125 are preferably formed of a conductive and robust material (e.g., stainless steel). In one example, the universal DC power adaptor has an overall length of about 2.6 inches, an overall width of about 1.5 inches, and an overall height of about 1.48 inches. Batteries used with the radios often have an overall height greater than 3 inches (e.g., 3.28 inches). As previously described, connecting the universal DC power adaptor to remote an external DC power source reduces the overall height profile of the radio, antenna, and power source when compared to using a battery, which is advantageous as it keeps the antenna from hitting an operator in the face.

The input connector 135 is operable to mate to an external DC power source (e.g., a remote external DC power source). Consequently, the type of input connector 135 depends on the mating connector of the external DC power source. The external DC power source includes, but is not limited to, portable battery packs, portable power cases, rechargeable batteries, non-rechargeable batteries, and similar devices. Examples of a portable battery pack are described in U.S. Pat. Nos. 9,780,344, 10,461,289, and 10,531,590, and U.S. Patent Publication Nos. 20180258882, 20190109349, 20200099023, and 20200187379, each of which is incorporated herein by reference in its entirety. Examples of a portable power case are described in U.S. Patent Publication Nos. 20180102656, 20180062197, and 20190081493, each of which is incorporated herein by reference in its entirety.

In one embodiment, the input connector 135 is preferably a locking connector. In one embodiment, the input connector 135 is a TAJIMI R04-p5m connector. Advantageously, this allows the input connector 135 to mate with a mating connector on an external DC power source (e.g., rechargeable battery, non-rechargeable battery) in a locking fashion, thereby preventing communications from being disrupted by a loose connection.

In one embodiment, the PCB 130 includes an isolator to prevent radio interference caused by the circuit created between the first radio, the headset, the second radio, and the battery used to power the first radio and the second radio. In one embodiment, the isolator includes at least one diode to allow current to flow in a single direction.

As previously described, in one embodiment, the universal DC power adaptor includes at least one cable with shielding. The present invention has a ground plane all the way through the PCB 130. Advantageously, the at least one cable with the shielding prevents radio interference caused by the unshielded cable acting as an antenna.

Figure 3:
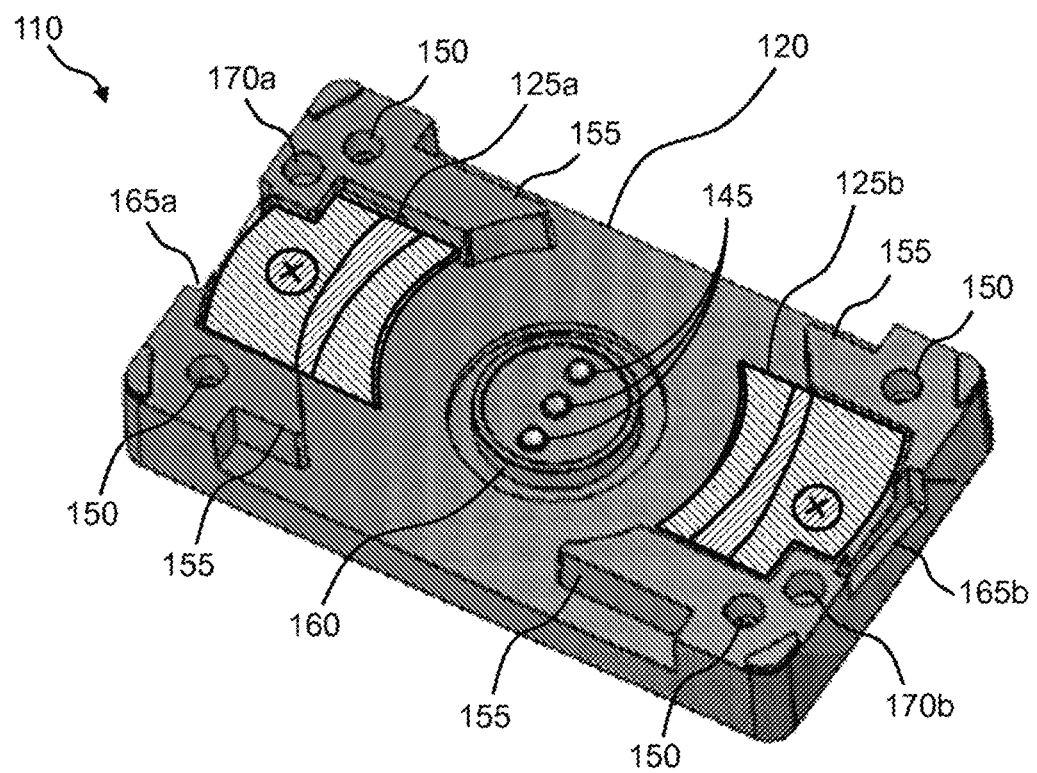
FIG. 3 illustrates a perspective view of a portion of the adaptor plate assembly of the universal DC power adaptor.
Figure 4:
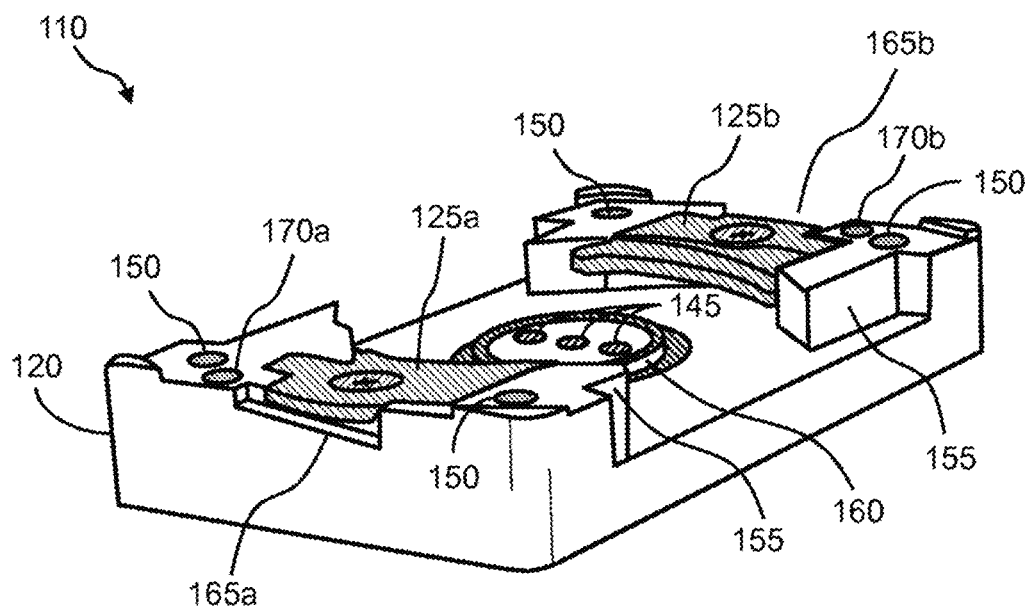
FIG. 4 illustrates another perspective view of a portion of the adaptor plate assembly of the universal DC power adaptor.

FIG. 3 and FIG. 4 show perspective views of a portion of the adaptor plate assembly 110 of the universal DC power adaptor. FIG. 3 and FIG. 4 show views of the adaptor plate 120 with the mating plates 125 affixed thereto. In one embodiment, each of the mating plates 125a and 125b is affixed to the adaptor plate 120 with a screw. In another embodiment, the adaptor plate assembly includes at least one mating clip on each side of the adaptor plate assembly. For example, and not limitation, the at least one mating clip is welded, glued, or otherwise permanently affixed to the adaptor plate assembly. The at least one mating clip allows for the mating plates to attach to the adaptor plate. The adaptor plate 120 also includes four through-holes 150 (e.g., one at each corner) that are used for screwing the adaptor plate 120 to the adaptor housing 115.

Figure 5:
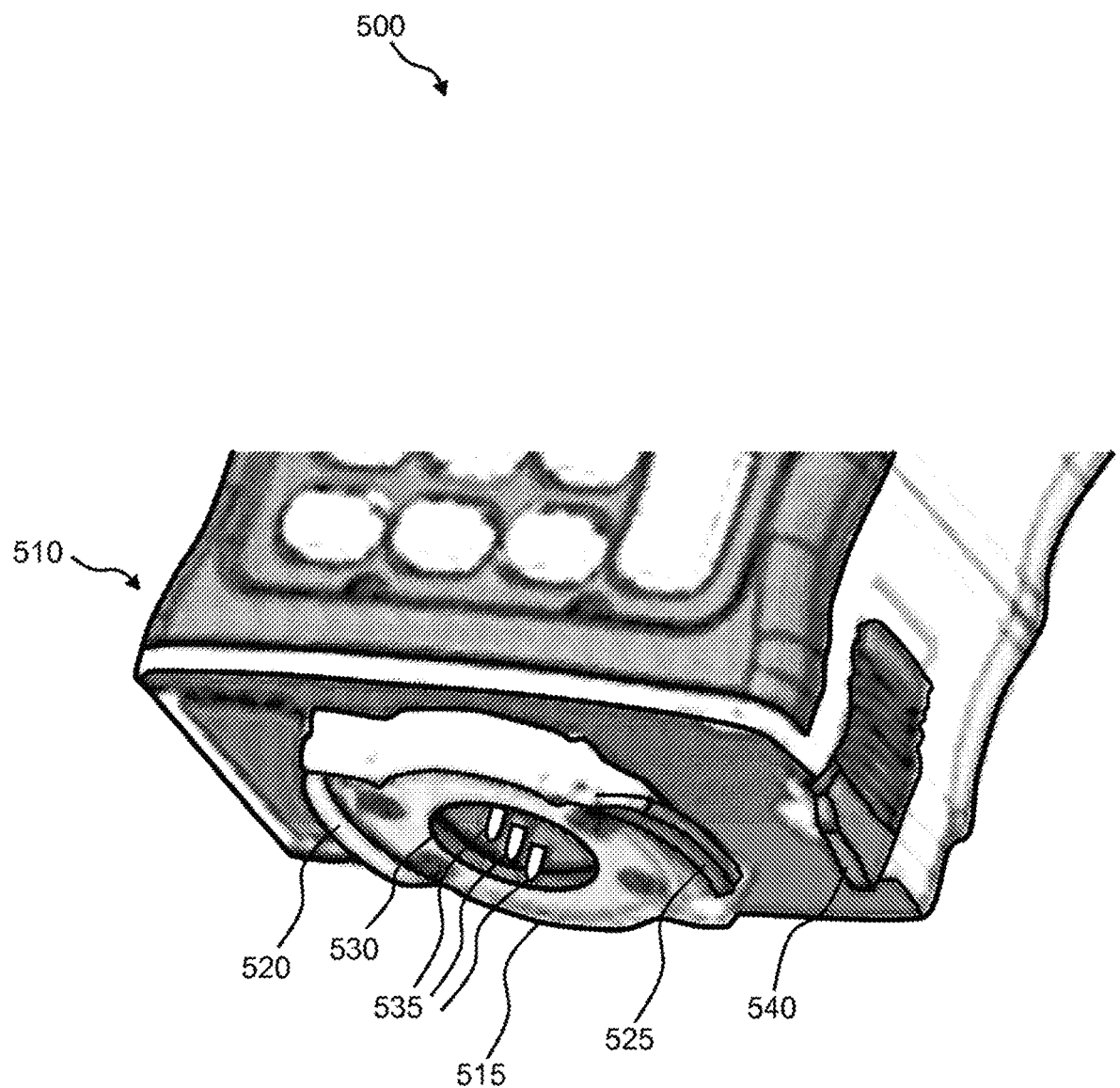
FIG. 5 illustrates a perspective view of the base portion of the PRC-152 radio that mounts to the universal DC power adaptor.
Figure 6:
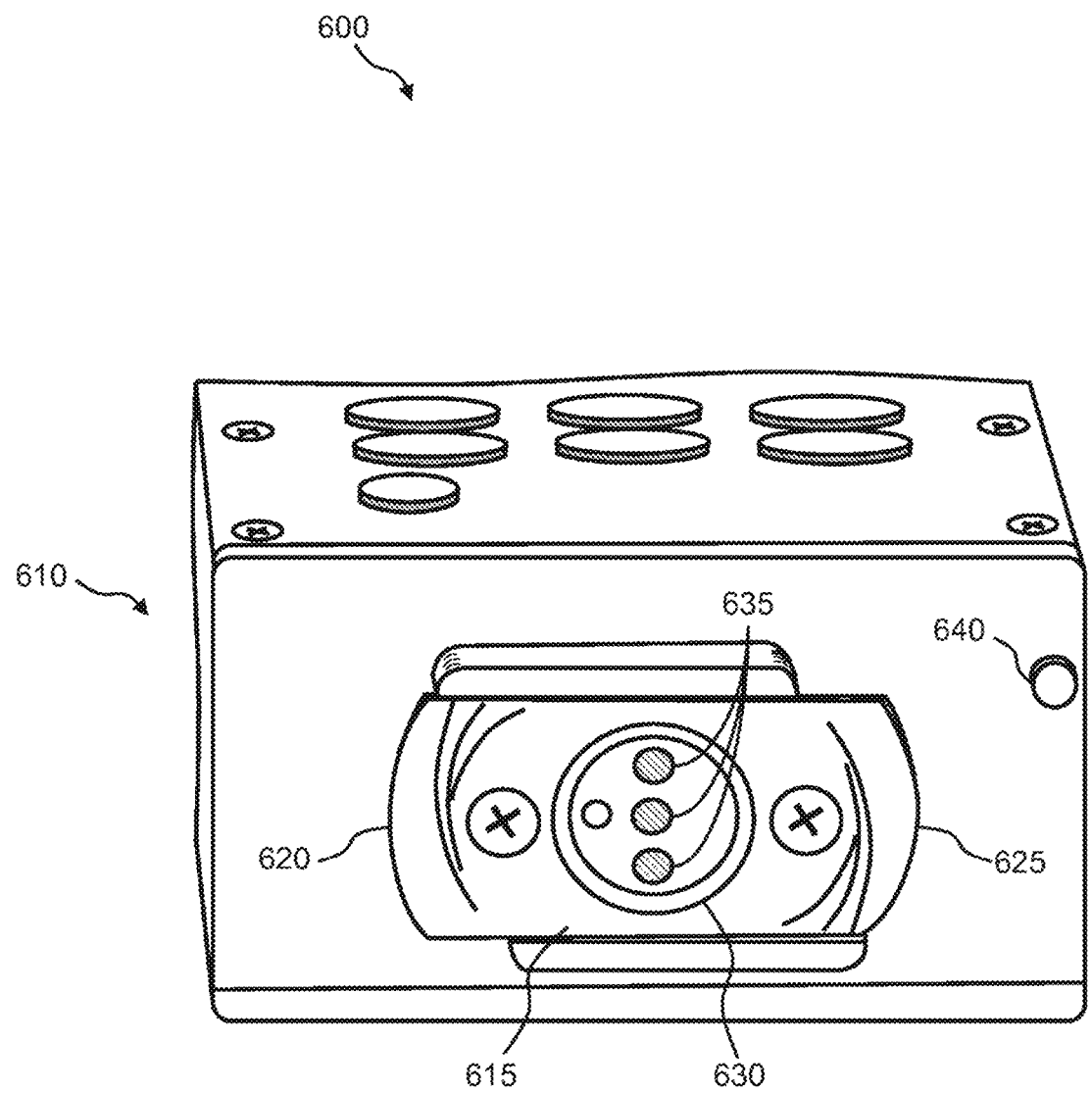
FIG. 6 illustrates a perspective view of the base portion of the PRC-148 radio that mounts to the universal DC power adaptor.

In another embodiment, the cross-sectional footprint and dimensions of the universal DC power adaptor substantially correspond to those of the PRC-152 radio 500 (FIG. 5) and the PRC-148 radio 600 (FIG. 6). Further, the mating plates 125a (FIG. 3) and 125b (FIG. 3) and the alignment components 155 (FIG. 3) of the universal DC power adaptor are designed to receive and engage with the mating plate 515 of the PRC-152 radio 500 (FIG. 5) and the mating plate 615 of the PRC-148 radio 600 (FIG. 6). For example, in one embodiment, the edges of the two mating plates are designed to receive and engage with the first end 520 and the second end 525, respectively, of the mating plate 515 of the PRC-152 radio 500 (FIG. 5). Likewise, the edges of the two mating plates are designed to receive and engage with the first end 620 and the second end 625, respectively, of the mating plate 615 of the PRC-148 radio 600 (FIG. 6). Once engaged, the voltage output pins of the universal DC power adaptor substantially align with and electrically couple to the voltage input pins 535 of the PRC-152 radio 500 (FIG. 5) or the voltage input pins 635 of the PRC-148 radio 600 (FIG. 6).

In another embodiment, the mating plates are arranged with respect to certain alignment components and with respect to the voltage output pins. The at least one alignment component is any type of features or rails for guiding the base portion of the PRC-148 radio or the PRC-152 radio onto the adaptor plate of the universal DC power adaptor. Namely, the alignment components are designed to substantially match corresponding features of the PRC-148 radio and the PRC-152 radio that allow the radios to twist and lock into the adaptor plate assembly.

As shown in FIG. 3, the voltage output pins 145 are arranged at the center region of adaptor plate 120 and between the mating plates 125a and 125b. In a preferred embodiment, the voltage output pins 145 are arranged in a pedestal structure 160 such that there is electrical isolation between the voltage output pins 145. In another embodiment, the voltage output pins 145 are arranged at about the pivot point of the PRC-148 radio and the PRC-152 radio when twisted and locked into the adaptor plate assembly. The position of the voltage output pins 145 is provided to substantially align with the corresponding voltage input pins 535 of the PRC-152 radio as shown in FIG. 5 and the corresponding voltage input pins 635 of the PRC-148 radio as shown in FIG. 6. In one embodiment, a center pin of the voltage output pins 145 of the universal DC power adaptor is configured for data communication, and a top pin and a bottom pin of the voltage output pins 145 are configured for power output (e.g., both positive) from the universal DC power adaptor to the radio. In a preferred embodiment, an O-ring is positioned around the pedestal structure 160 to protect an electrical connection between the voltage output pins 145 and the voltage input pins on the radio from environmental elements (e.g., water).

FIG. 5 illustrates a perspective view of a base portion 510 of a PRC-152 radio 500 that is operable to mount to the universal DC power adaptor. The base portion 510 of the PRC-152 radio 500 includes a mating plate 515 that has a first end 520 and a second end 525. Further, there is an opening 530 at the center portion of the mating plate 515. Voltage input pins 535 (e.g., three voltage input pins 535) are arranged in the opening 530 of the mating plate 515, as shown. Additionally, a movable locking clip 540 is provided on one side of the body of the PRC-152 radio 500. Conventionally, the mating plate 515, the voltage input pins 535, and the movable locking clip 540 are used for coupling a rechargeable battery (not shown) to the base portion 510 of the PRC-152 radio 500. The mating plate 515, the voltage input pins 535, and the movable locking clip 540, however, are operable to couple the universal DC power adaptor to the base portion 510 of the PRC-152 radio 500 in place of the rechargeable battery.

In one embodiment, the universal DC power adaptor is operable to disengage from the PRC-152 radio by disengaging the movable locking clip of the PRC-152 radio from the side locking feature of the universal DC power adaptor and then twisting the PRC-152 radio with respect to the universal DC power adaptor to disengage the mating plates. Similarly, the universal DC power adaptor is operable to disengage from the PRC-148 radio by disengaging the spring-loaded button key of the PRC-148 radio from the hole or detent of the universal DC power adaptor and then twisting the PRC-148 radio with respect to the universal DC power adaptor to disengage the mating plates.

FIG. 6 illustrates a perspective view of a base portion 610 of a PRC-148 radio 600 that mounts to the universal DC power adaptor. The base portion 610 of the PRC-148 radio 600 includes a mating plate 615 that has a first end 620 and a second end 625. Further, there is an opening 630 at the center portion of the mating plate 615. Voltage input pins 635 (e.g., three voltage input pins 635) are arranged in the opening 630 of the mating plate 615, as shown. Additionally, a spring-loaded button key 640 is provided on the bottom surface of the body of the PRC-148 radio 600. Conventionally, the mating plate 615, the voltage input pins 635, and the spring-loaded button key 640 are operable to couple a rechargeable battery (not shown) to the base portion 610 of the PRC-148 radio 600. In another embodiment, the mating plate 615, voltage input pins 635, and spring-loaded button key 640, are operable to couple the universal DC power adaptor to the base portion 610 of the PRC-148 radio 600 in place of the rechargeable battery.

Referring now to FIG. 5 and FIG. 6, certain features of the PRC-152 radio 500 and of the PRC-148 radio 600 are substantially the same. For example, the cross-sectional footprint and dimensions of the base portion 510 of the PRC-152 radio 500 are substantially the same as the cross-sectional footprint and dimensions of the base portion 610 of the PRC-148 radio 600. Further, the features of the mating plate 515 of the PRC-152 radio 500 are substantially the same as the features of the mating plate 615 of the PRC-148 radio 600. Further still, with respect to the mating plate 515 of the PRC-152 radio 500 and with respect to the mating plate 615 of the PRC-148 radio 600, the number and position of the voltage input pins 535 and the number and position the voltage input pins 635, respectively, are substantially the same.

However, certain other features of the PRC-152 radio 500 and the PRC-148 radio 600 are unique, i.e., not substantially the same. For example, the movable locking clip 540 on one side of the PRC-152 radio 500 is unique only to the PRC-152 radio 500. Further, the spring-loaded button key 640 on the bottom surface of the body of the PRC-148 radio 600 is unique only to the PRC-148 radio 600. The PRC-161 has a similar body to the PRC-148, and the PRC-163 has a similar body to the PRC-152.

Accordingly, the universal DC power adaptor includes features for accommodating these unique features as shown in FIGS. 3-4. In one embodiment, the adaptor plate 120 further includes a pair of side locking features 165. Namely, a side locking feature 165a on one end of the adaptor plate 120 and a side locking feature 165b on the other end of the adaptor plate 120. The two side locking features 165 are designed to engage with the movable locking clip 540 of the PRC-152 radio 500 (FIG. 5). Two side locking features 165 are provided so that the PRC-152 radio can be oriented in any way for coupling to the universal DC power adaptor 100. This is advantageous as it allows the operator to position the cable in such a way as to minimize mechanical interference with the radio's controls, adaptors, and antennas. However, in another embodiment, the universal DC power adaptor includes only one side locking feature. This embodiment of the universal DC power adaptor is configured so the PRC-152 radio is only operable to attach to the universal DC power adaptor in a specific orientation.

Additionally, as shown in FIG. 4, the adaptor plate 120 includes a pair of holes or detents 170. Namely, a hole or detent 170a on one end of the adaptor plate 120 and a hole or detent 170b on the other end of the adaptor plate 120. The two holes or detents 170 are designed to engage with the spring-loaded button key 640 of the PRC-148 radio 600 (FIG. 6). Two holes or detents 170 are provided so that the PRC-148 radio can be oriented in any way for coupling to the universal DC power adaptor 100. However, in another embodiment, the universal DC power adaptor includes only one hole or detent. In this case, the universal DC power adaptor is configured so the PRC-148 radio is only operable to attach to the universal DC power adaptor in a specific orientation.

Figure 7:
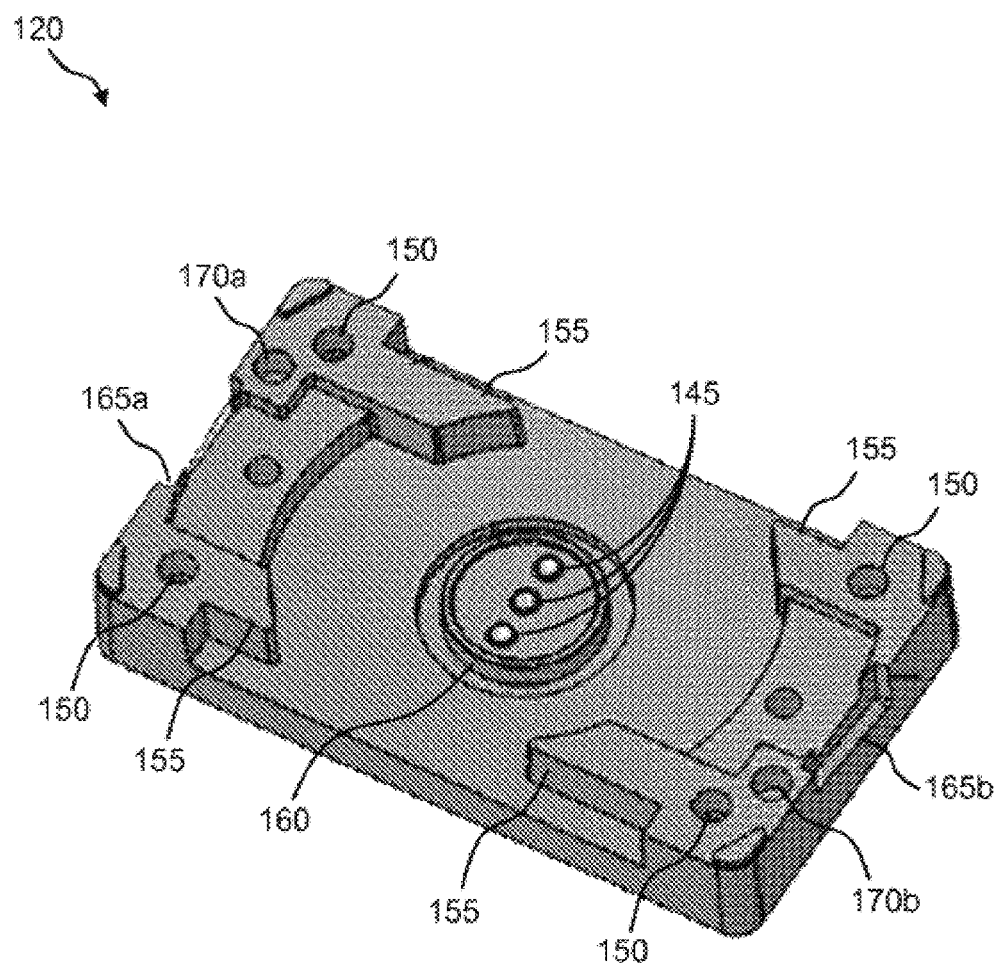
FIG. 7 illustrates an angled perspective view of an example of the adaptor plate of the universal DC power adaptor.
Figure 8A:
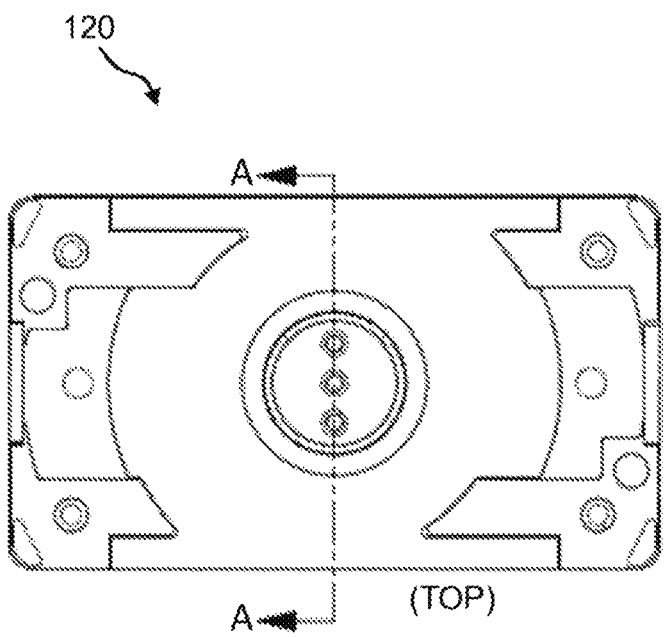
FIG. 8A illustrates a top perspective view of an example of the adaptor plate of the universal DC power adaptor.
Figure 8B:
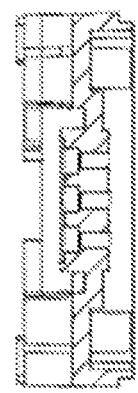
FIG. 8B illustrates a cross-sectional view of an example of the adaptor plate of the universal DC power adaptor.
Figure 8C:
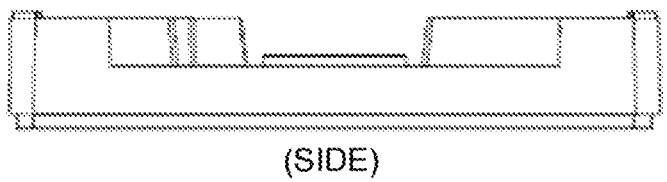
FIG. 8C illustrates a side perspective view of an example of the adaptor plate of the universal DC power adaptor.
Figure 8D:
FIG. 8D illustrates an end perspective view of an example of the adaptor plate of the universal DC power adaptor.
Figure 8E:
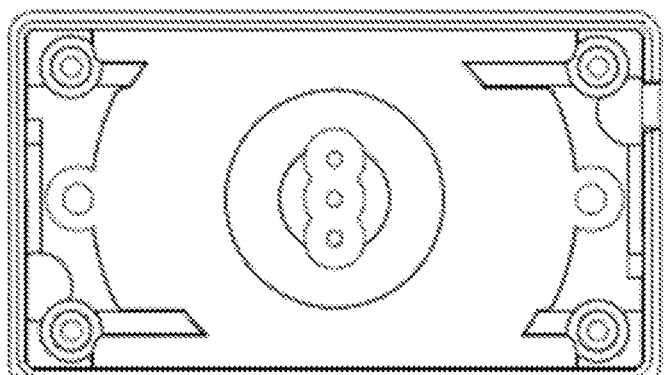
FIG. 8E illustrates a bottom perspective view of an example of the adaptor plate of the universal DC power adaptor.
Figure 9:
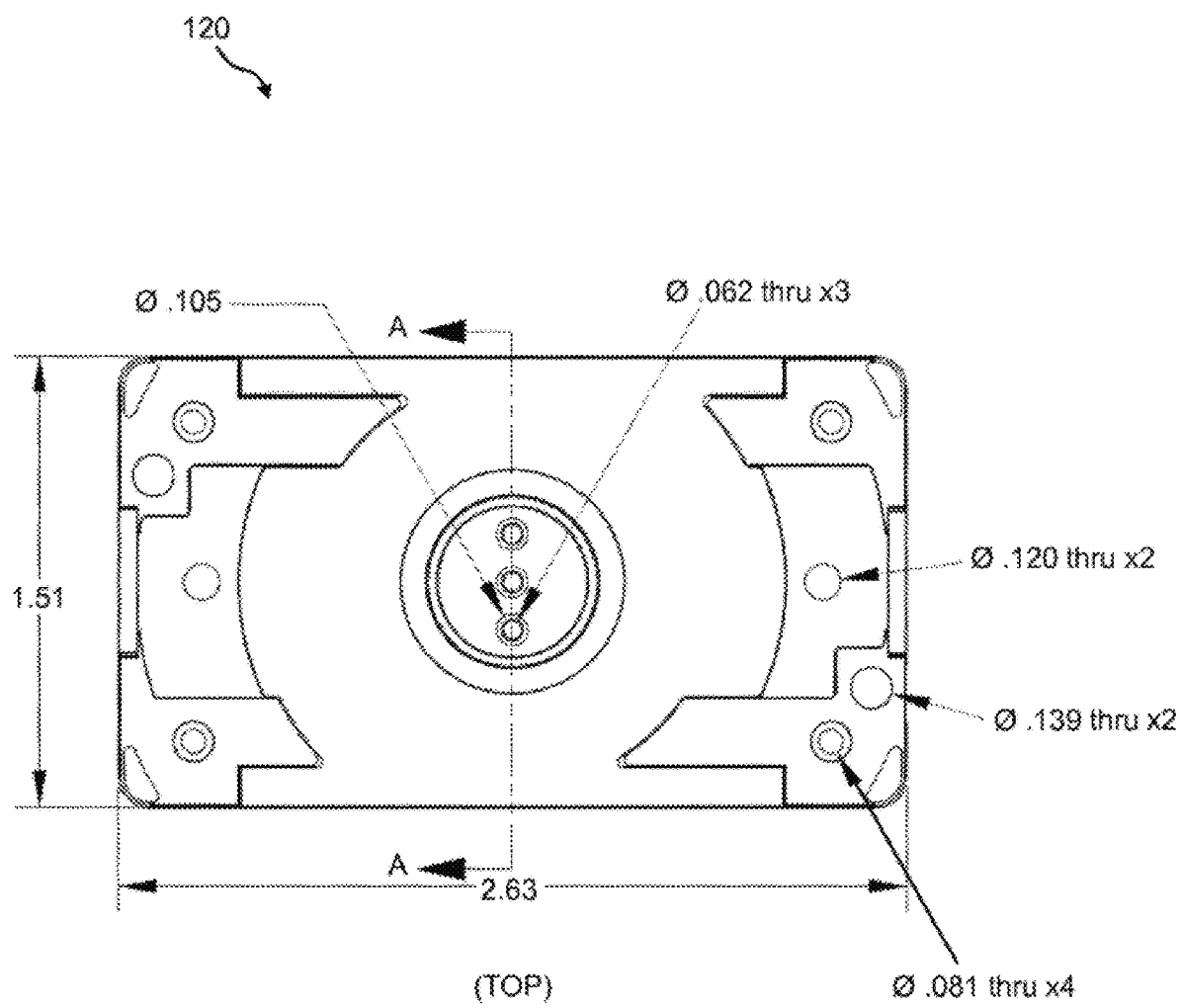
FIG. 9 illustrates a top perspective view of the adaptor plate of the universal DC power adaptor according to one embodiment of the present invention.
Figure 10:
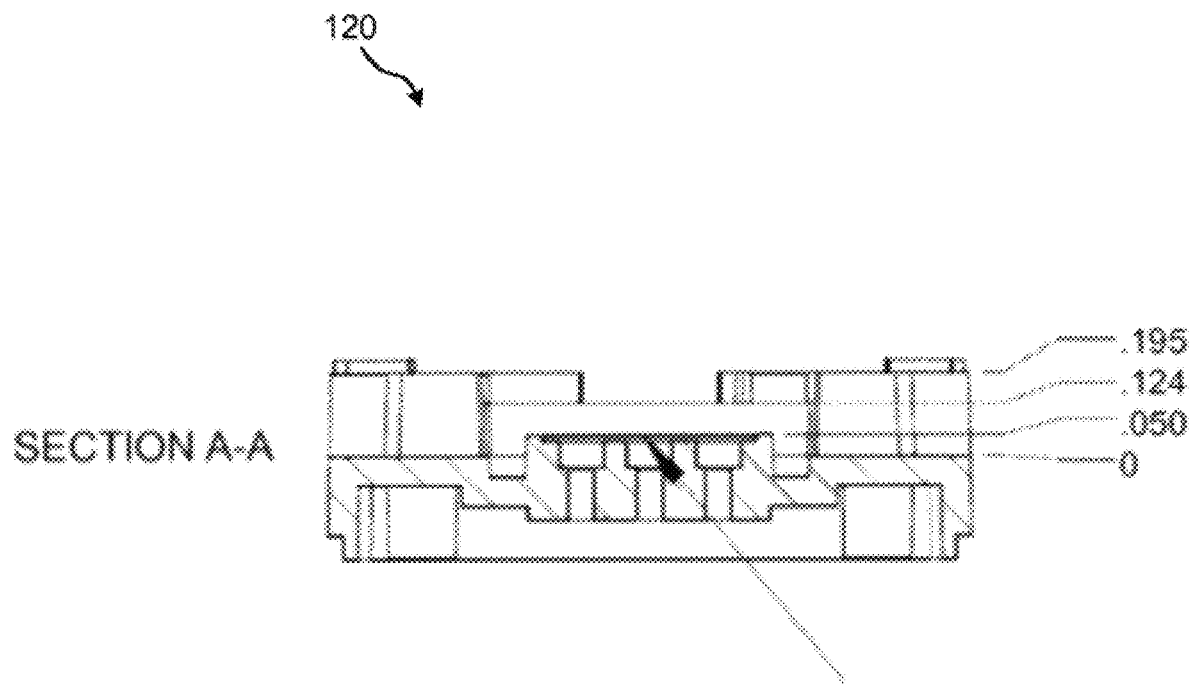
FIG. 10 illustrates a cross-sectional view of the adaptor plate of the universal DC power adaptor according to one embodiment of the present invention.
Figure 11:
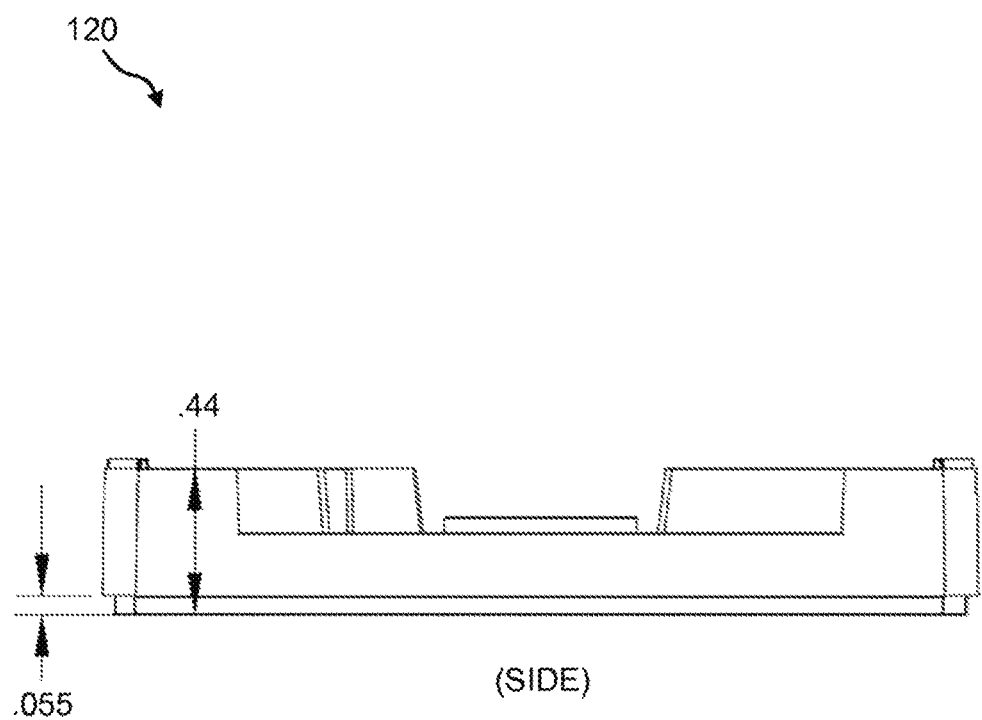
FIG. 11 illustrates more details of the side perspective view of an example of the adaptor plate of the universal DC power adaptor.
Figure 12:
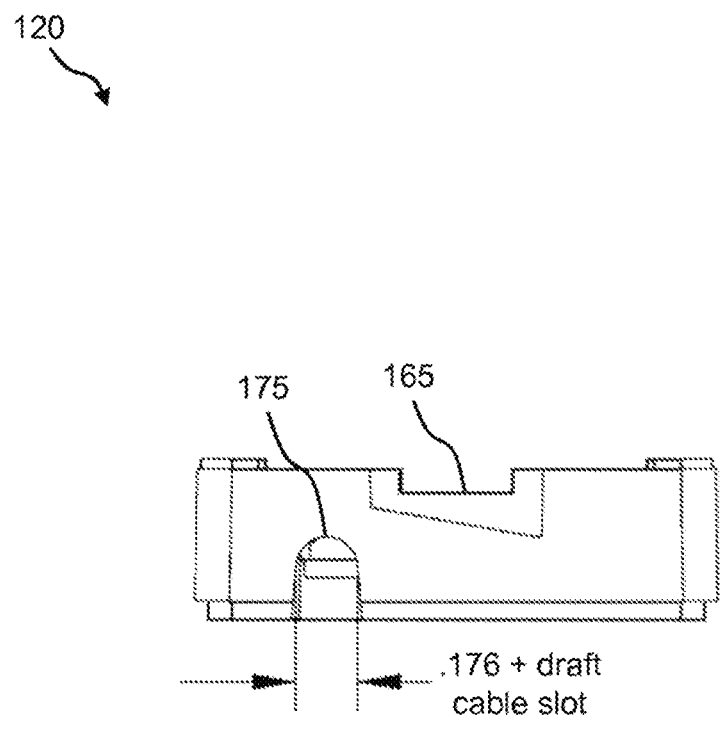
FIG. 12 illustrates more details of the end perspective view of an example of the adaptor plate of the universal DC power adaptor.
Figure 13:
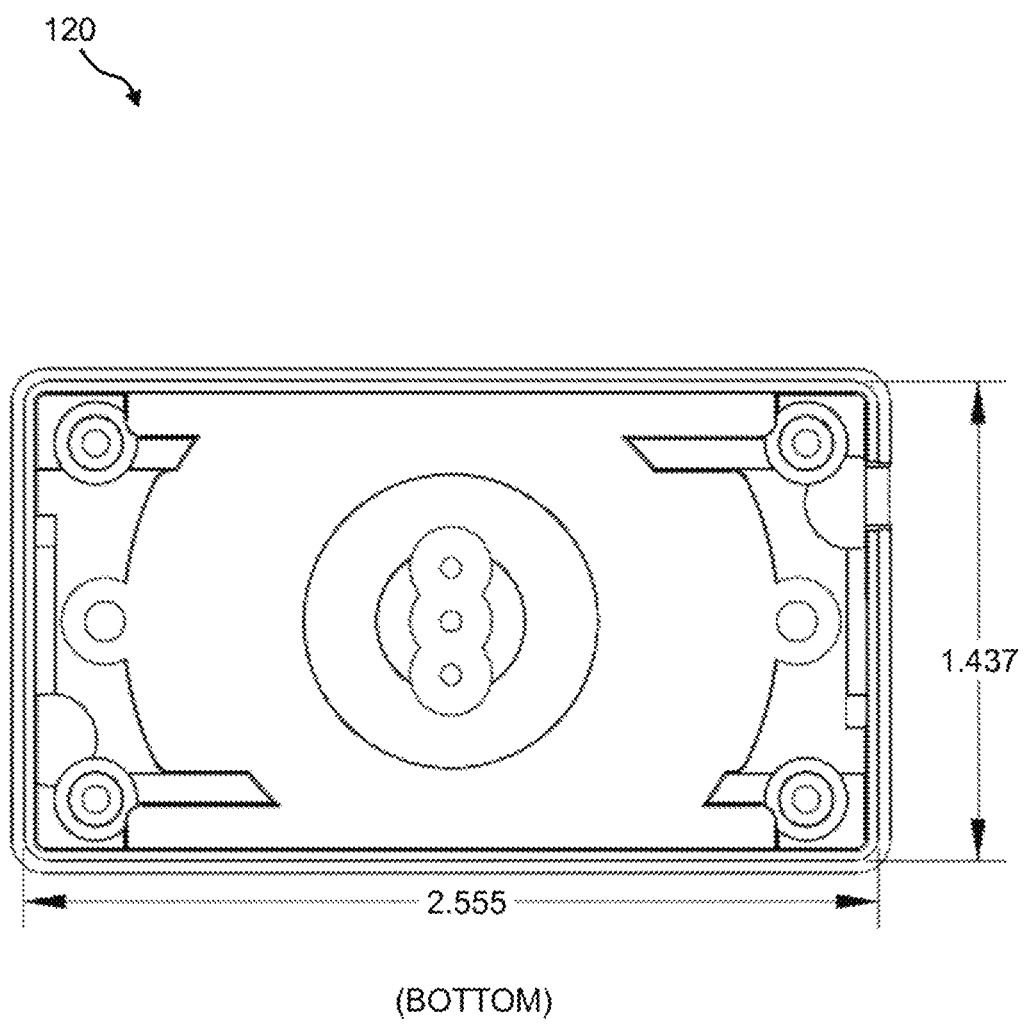
FIG. 13 illustrates more details of the bottom perspective view of an example of the adaptor plate of the universal DC power adaptor.

FIG. 7 shows a perspective view of the adaptor plate 120 without mating plates. FIG. 8A shows a top view of the adaptor plate 120 according to one embodiment of the present invention. FIG. 8B illustrates a cross-sectional side view taken along line A-A of the top view of the adaptor plate according to one embodiment of the present invention. FIG. 8C illustrates a side view of the adaptor plate according to one embodiment of the present invention. FIG. 8D illustrates an end view of the adaptor plate according to one embodiment of the present invention. FIG. 8E illustrates a bottom view of the adaptor plate according to one embodiment of the present invention. FIG. 9 shows a top view of the adaptor plate 120 according to one embodiment of the present invention. FIG. 10 shows a cross-sectional view of the adaptor plate 120, taken along line A-A of FIG. 9. FIG. 11 shows a side view of the adaptor plate 120 according to one embodiment of the present invention. FIG. 12 shows more details of the end view of the adaptor plate 120. FIG. 12 shows a cable slot 175 that is operable to receive the flexible wire or cable 140. FIG. 13 shows a bottom view of the adaptor plate 120 according to one embodiment of the present invention.

Figure 14:
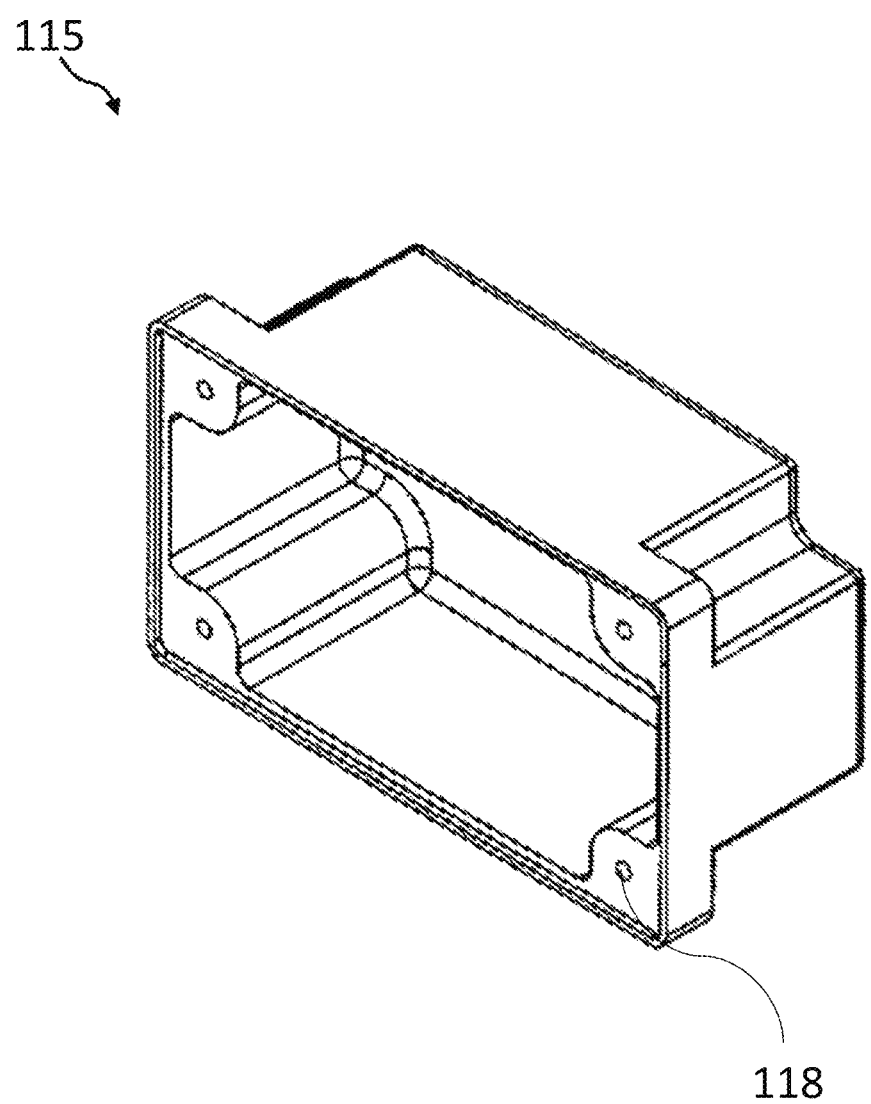
FIG. 14 illustrates an angled perspective view of an example of the adaptor housing of the universal DC power adaptor.
Figure 15:
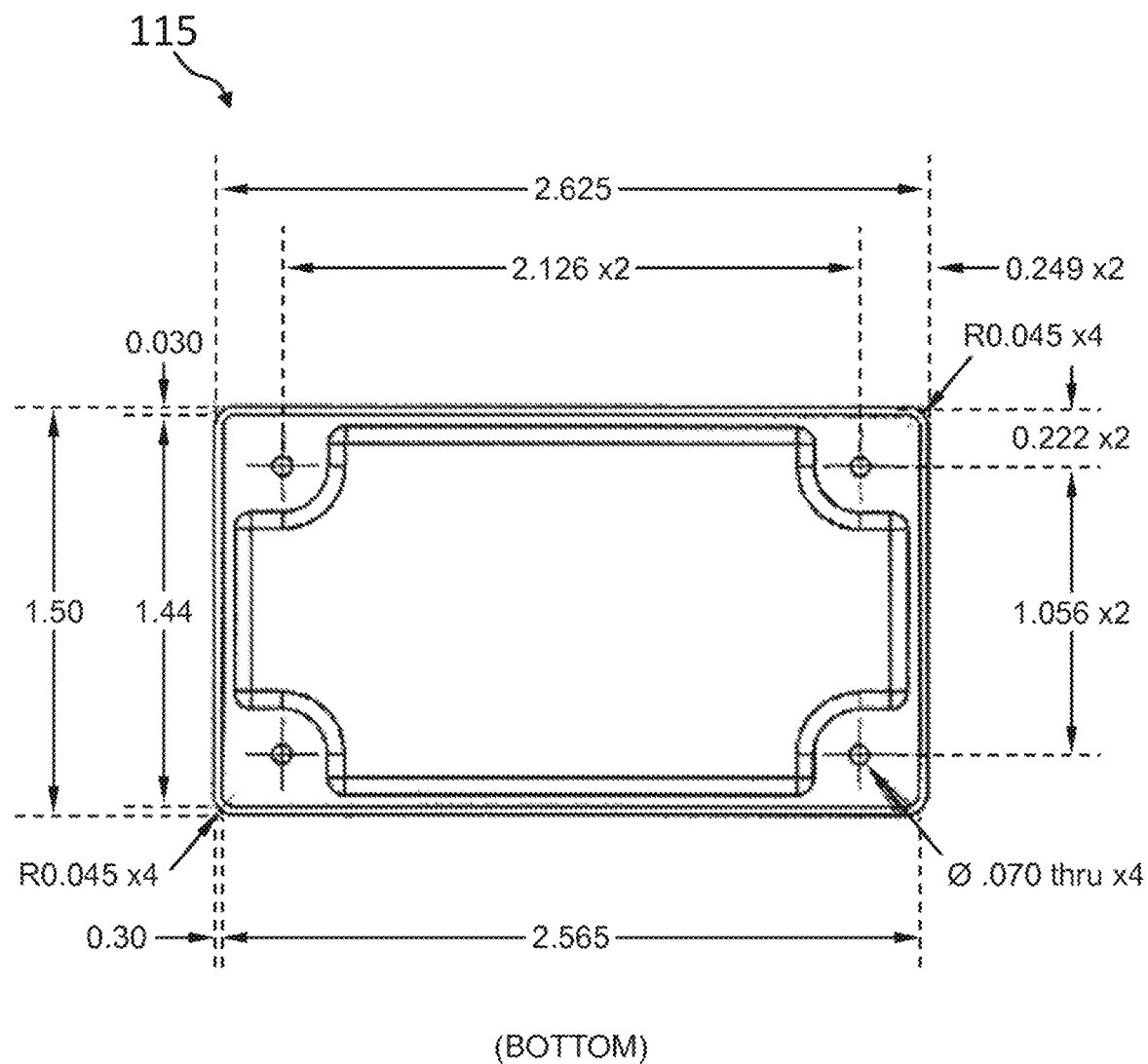
FIG. 15 illustrates a bottom perspective view of an example of the adaptor housing of the universal DC power adaptor.
Figure 16:
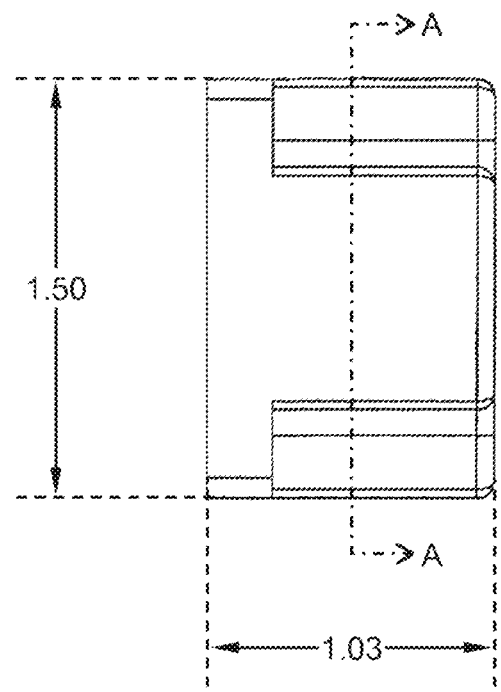
FIG. 16 illustrates an end perspective view of an example of the adaptor housing of the universal DC power adaptor.
Figure 17:
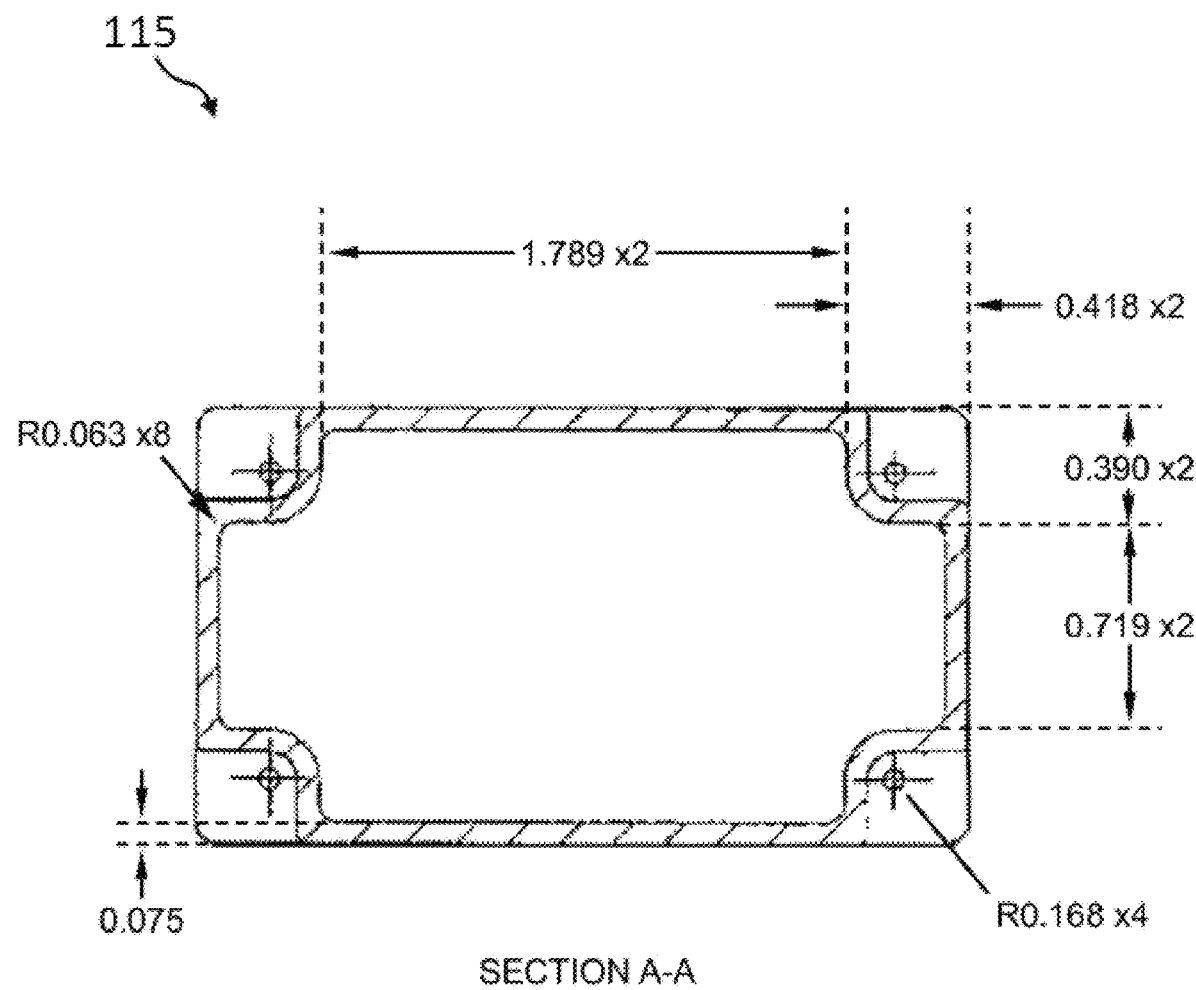
FIG. 17 illustrates a cross-section view of an example of the adaptor housing of the universal DC power adaptor.

FIG. 14 shows a perspective view of an example of the adaptor housing 115. The adaptor housing 115 includes a plurality of holes 118. The plurality of holes 118 align with the through-holes from the adaptor plate assembly for joining (i.e., with a screw) the adaptor plate assembly to the adaptor housing 115. FIG. 15 shows a bottom view of an example of the adaptor housing 115. FIG. 16 shows an end view of an example of the adaptor housing 115. FIG. 17 shows a cross-sectional view of an example of the adaptor housing 115, taken along line A-A of FIG. 16.

Figure 18:
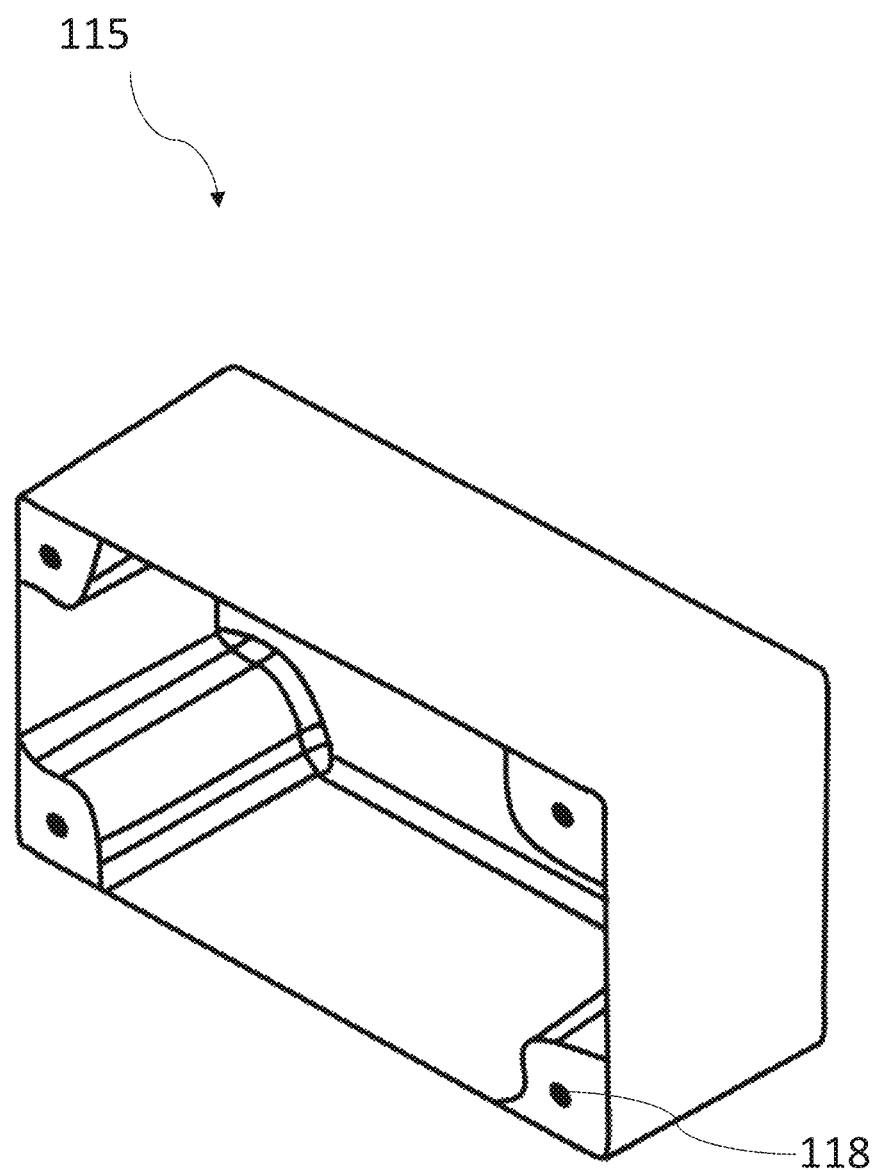
FIG. 18 illustrates an angled perspective view of another example of the adaptor housing of the universal DC power adaptor.
Figure 19:
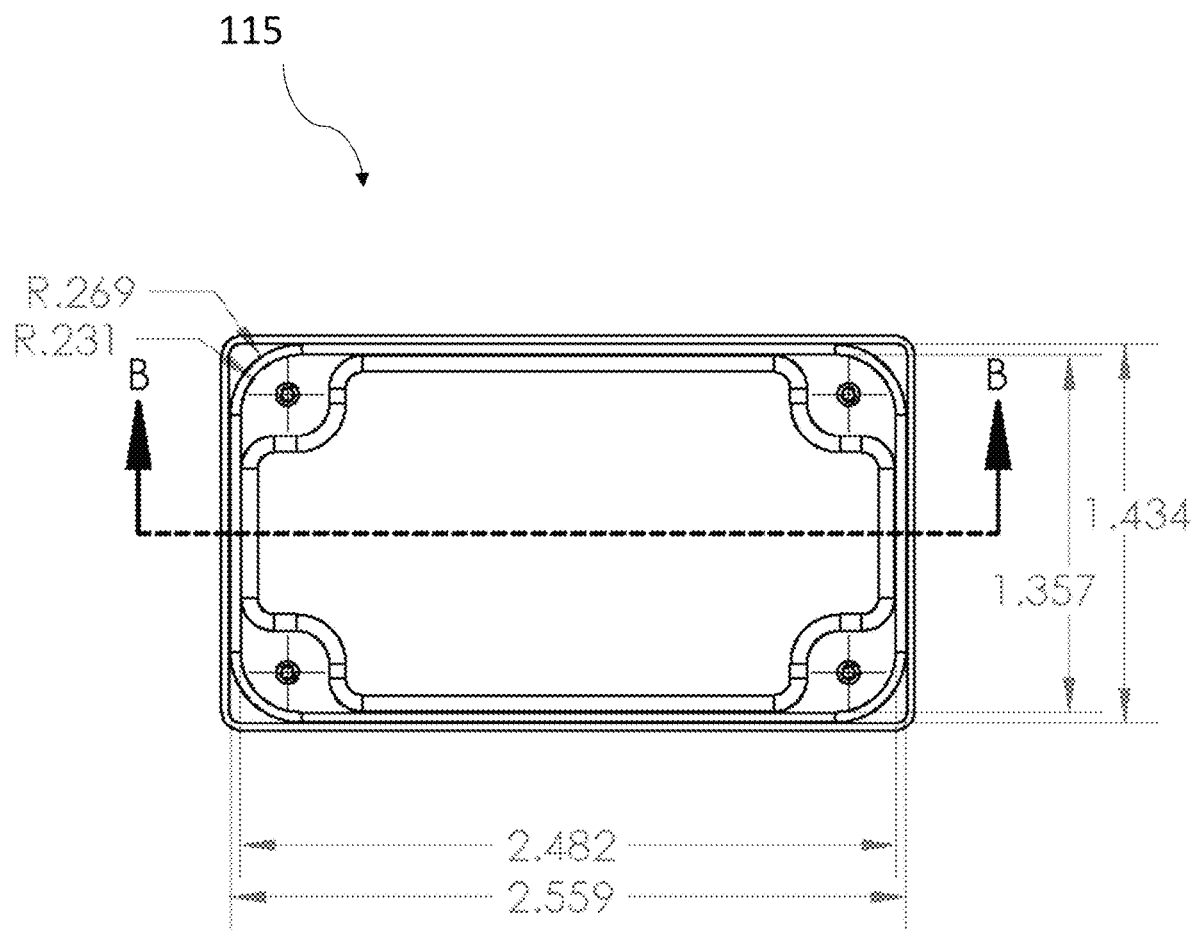
FIG. 19 illustrates a bottom perspective view of another example of the adaptor housing of the universal DC power adaptor.
Figure 20:
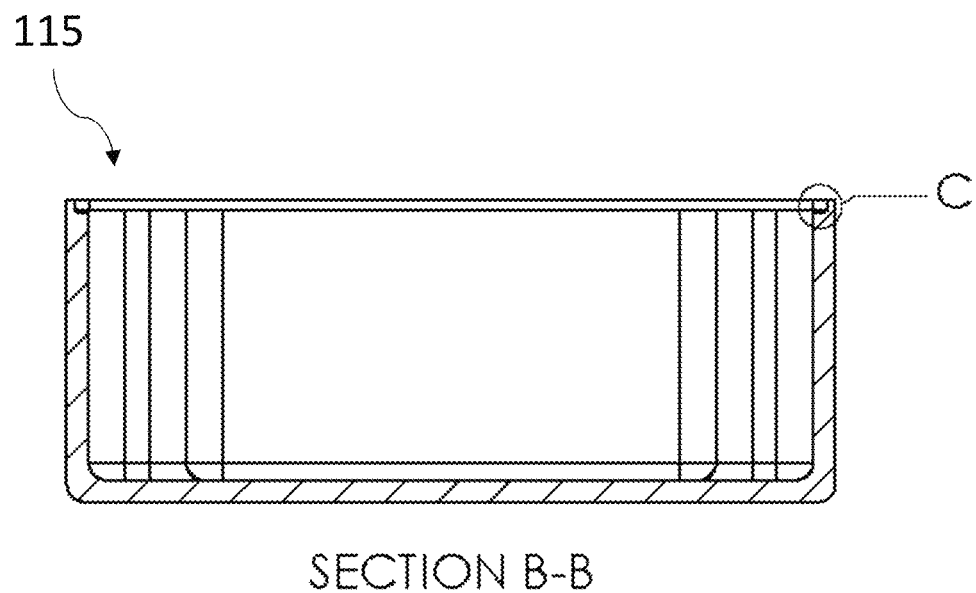
FIG. 20 illustrates a cross-section view of another example of the adaptor housing of the universal DC power adaptor.
Figure 21:
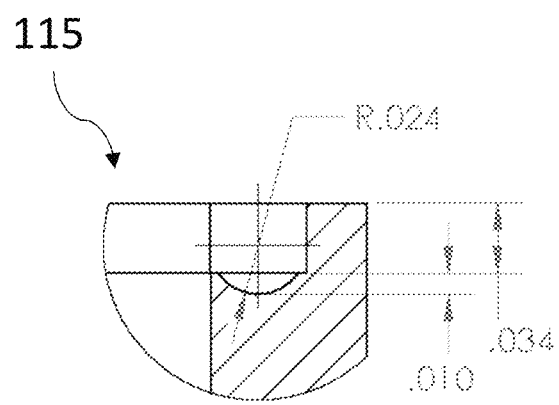
FIG. 21 illustrates a detailed view of another example of the adaptor housing of the universal DC power adaptor.

FIG. 18 shows a perspective view of another example of the adaptor housing 115. Advantageously, the adaptor housing 115 shown in FIG. 18 includes rounded corners that prevent snagging of pouches and other devices that are used simultaneously with the universal DC power adaptor. FIG. 19 illustrates a bottom view of another example of the adaptor housing 115 according to one embodiment of the present invention. FIG. 20 shows a cross-sectional view of the adaptor housing 115, taken along line B-B of FIG. 19. FIG. 21 shows a detailed view of the adaptor housing 115.

The universal DC power adaptor is preferably sized to attach to a radio and remain flush against a side of the radio. In one embodiment, the universal DC power adaptor is sized so as not to interfere with a connector (e.g., a 32-pin connector) that extends downward on the side of the radio.

Figure 22:
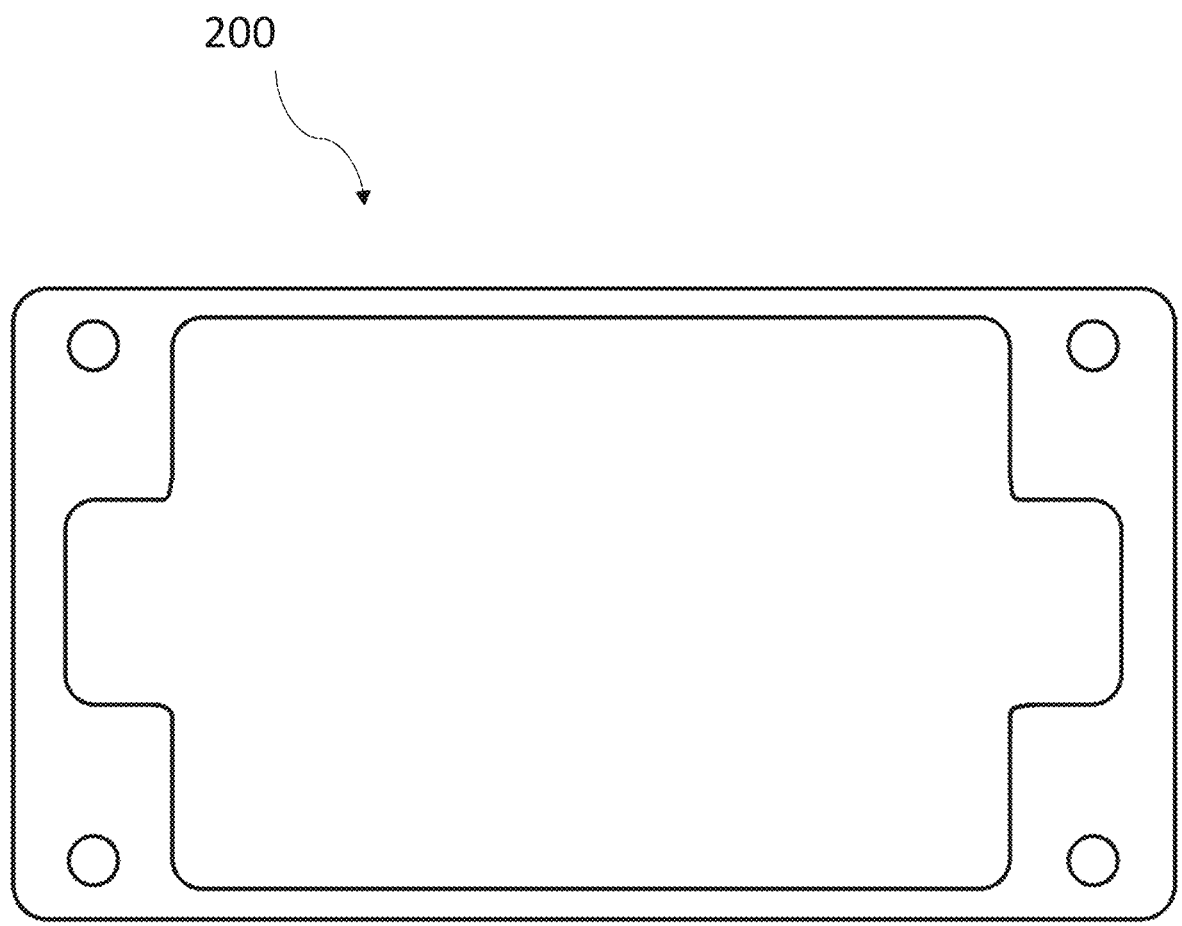
FIG. 22 illustrates one example of a gasket for the universal DC power adaptor.

In one embodiment, the present invention includes a gasket functionally positioned between the adaptor plate assembly and the adaptor plate assembly. FIG. 22 illustrates a gasket 200 according to one embodiment of the present invention. The gasket 200 includes a plurality of corresponding holes 205. The plurality of corresponding holes 205 align with the plurality of holes in the adaptor housing and the through-holes from the adaptor plate assembly for joining (i.e., with a screw) the adaptor plate, the gasket, and the adaptor housing. Advantageously, this allows for the universal DC power adaptor to be used in a plurality of harsh environments. In one embodiment, the gasket includes an elastomeric material (e.g., rubber, silicone).

Figure 23:
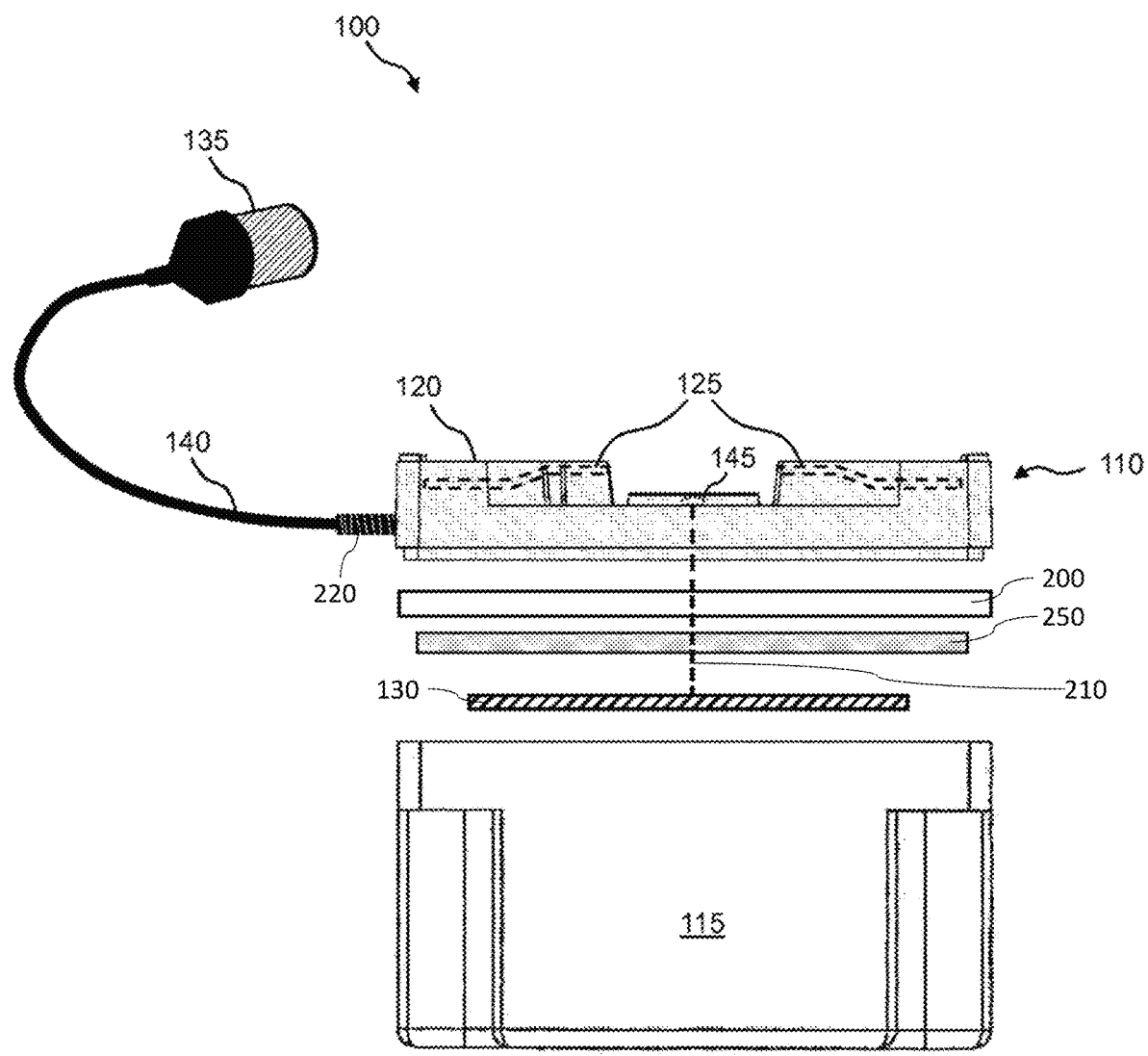
FIG. 23 illustrates one example of a side view of the universal DC power adaptor in a disassembled state.

FIG. 23 illustrates one embodiment of a universal DC power adaptor including a gasket 200, a heat-shielding or blocking, heat-dissipating and/or heat signature-reducing material layer 250, and a flexible omnidirectional lead including a spring 220. Additional details about the flexible omnidirectional lead are in FIG. 24. The gasket 200 is functionally positioned between the adaptor plate assembly 110 and the adaptor housing 115. The PCB 130 is electrically connected to the voltage output pins 145 via at least one wire 210.

In one embodiment, the universal DC power adaptor includes a heat-shielding or blocking, heat-dissipating and/or heat signature-reducing material layer or coating. In one embodiment, the heat-shielding or blocking, heat-dissipating and/or heat signature-reducing material layer or coating further includes anti-static, anti-radio frequency (RF), anti-electromagnetic interference (EMI), anti-tarnish, and/or anti-corrosion materials and properties. In a preferred embodiment, a heat-shielding or blocking, heat-dissipating and/or heat signature-reducing material layer 250 is functionally positioned between the adaptor plate assembly and the control electronics within the adaptor housing 115. Advantageously, this embodiment prevents heat transfer between the radio, which generates a large amount of heat, and the control electronics in the adaptor housing 115. Additionally or alternatively, the heat-shielding or blocking, heat-dissipating and/or heat signature-reducing material layer or coating covers an interior surface of the adaptor housing 115. Advantageously, this protects the control electronics in the adaptor housing 115 from external heat.

The heat-dissipating and/or heat signature-reducing layer 250 is any material that is suitable for dissipating heat from and/or reducing the heat signature of electronic devices and/or clothing. The heat-dissipating and/or heat signature-reducing layer 250 is from about 20 µm thick to about 350 µm thick in one example. In particular embodiments, the heat-dissipating and/or heat signature-reducing layer 250 has a thickness ranging from about 1 mil to about 6 mil, including, but not limited to, 1, 2, 3, 4, 5, and 6 mil, or about 25 µm to about 150 µm, including, but not limited to, 25, 50, 75, 100, 125, and 150 µm. Examples of the heat-dissipating and/or heat signature-reducing layer 250 include anti-static, anti-radio frequency (RF), and/or anti-electromagnetic interference (EMI) materials, such as copper shielding plastic or copper particles bonded in a polymer matrix, as well as anti-tarnish and anti-corrosion materials. A specific example of the heat-dissipating and/or heat signature-reducing layer 250 is the anti-corrosive material used in Corrosion Intercept Pouches, catalog number 034-2024-10, available from University Products Inc. (Holyoke, Mass.). The anti-corrosive material is described in U.S. Pat. No. 4,944,916 to Franey, which is incorporated by reference in its entirety. Such materials preferably include copper shielded or copper impregnated polymers including, but not limited to, polyethylene, low-density polyethylene, high-density polyethylene, polypropylene, and polystyrene. In another embodiment, the heat shielding or blocking, heat-dissipating, and/or heat signature-reducing layer 250 is a polymer with aluminum and/or copper particles incorporated therein. In particular, the surface area of the polymer with aluminum and/or copper particles incorporated therein preferably includes a large percent by area of copper and/or aluminum. By way of example and not limitation, the surface area of the heat-dissipating and/or heat signature-reducing layer 250 includes about 25% by area copper and/or aluminum, 50% by area copper and/or aluminum, 75% by area copper and/or aluminum, or 90% by area copper and/or aluminum. In one embodiment, the heat shielding or blocking, heat-dissipating, and/or heat signature-reducing layer 250 is substantially smooth and not bumpy. In another embodiment, the heat shielding or blocking, heat-dissipating, and/or heat signature-reducing layer 250 is not flat but includes folds and/or bumps to increase the surface area of the layer. Alternatively, the heat-shielding or blocking, heat-dissipating and/or heat signature-reducing layer 250 includes a fabric having at least one metal incorporated therein or thereon. The fabric further includes a synthetic component, such as by way of example and not limitation, a nylon, a polyester, or an acetate component. Preferably, the at least one metal is selected from the group consisting of copper, nickel, aluminum, gold, silver, tin, zinc, or tungsten.

Figure 24:
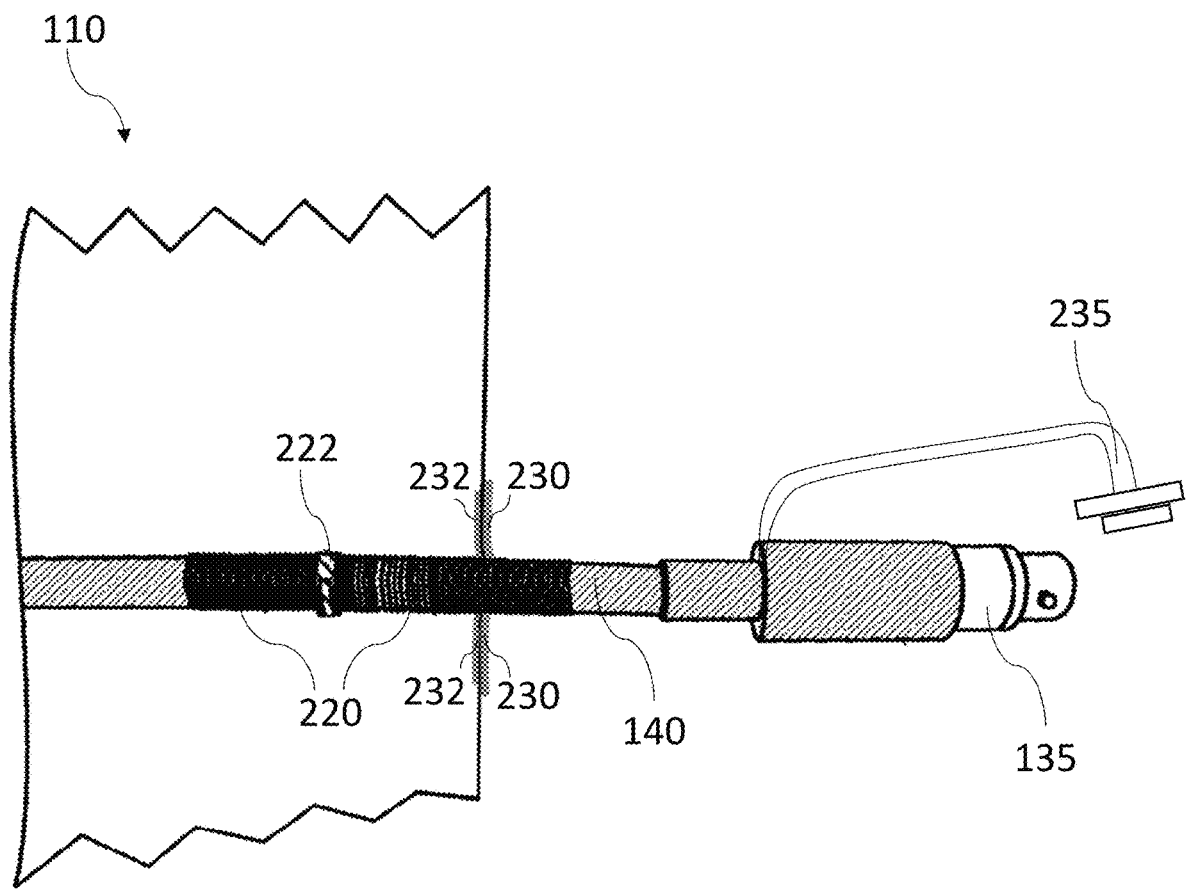
FIG. 24 illustrates an example of a flexible omnidirectional lead according to one embodiment of the present invention.

In one embodiment, the universal DC power adaptor includes at least one flexible omnidirectional lead as shown in FIG. 24. In one embodiment, an exterior gasket 230 and an interior gasket 232 are provided around each of the at least one flexible omnidirectional lead to seal an interior of the universal DC power adaptor from the external environment. Each flexible omnidirectional lead has a connector portion (e.g., input connector 135) and a wiring portion (e.g., flexible wire or cable 140). The input connector 135 is any type or style of connector needed to mate to the equipment to be used with the universal DC power adaptor. In a preferred embodiment, the input connector 135 is a female circular type of connector (e.g., female FISHER 105 A087 connector, TAJIMI part number R04-P5f). In yet another embodiment, the input connector 135 has an Ingress Protection (IP) rating of IP2X, IP3X, IP4X, IP5X, IP6X, IPX1, IPX2, IPX3, IPX4, IPX5, IPX6, IPX7, or IPX8. More preferably, the input connector 135 has an IP rating of IPX6, IPX7, or IPX8. IP ratings are described in IEC standard 60529, ed. 2.2 (05/2015), published by the International Electrotechnical Commission, which is incorporated herein by reference in its entirety. In one embodiment, the input connector 135 meets standards described in Department of Defense documents MIL-STD-202E, MIL-STD-202F published February 1998, MIL-STD-202G published 18 Jul. 2003, and/or MIL-STD-202H published 18 Apr. 2015, each of which is incorporated herein by reference in its entirety.

The flexible wire or cable 140 is fitted into a channel formed in the universal DC power adaptor (e.g., adaptor plate assembly 110) such that the input connector 135 extends away from the universal DC power adaptor (e.g., adaptor plate assembly 110). A spring 220 is provided around flexible wire or cable 140, such that a portion of spring 220 is inside the universal DC power adaptor (e.g., adaptor plate assembly 110) and a portion of spring 220 is outside the universal DC power adaptor (e.g., adaptor plate assembly 110). In one example, spring 220 is a steel spring that is from about 0.25 inches to about 1.5 inches long. The flexible wire or cable 140 and the spring 220 are held securely in the channel of the universal DC power adaptor (e.g., adaptor plate assembly 110) via a clamping mechanism 222. Alternatively, the flexible wire or cable 140 and the spring 220 are held securely in the channel of the universal DC power adaptor (e.g., adaptor plate assembly 110) using an adhesive, a retention pin, a hex nut, a hook anchor, and/or a zip tie. In an alternative embodiment, the channel is formed in the adaptor housing.

The presence of spring 220 around flexible wire or cable 140 allows the lead to be flexed in any direction for convenient connection to equipment from any angle. The presence of the spring 220 around the flexible wire or cable 140 also allows the lead to be flexed repeatedly without breaking or failing. The presence of the spring 220 further allows for the flexible wire or cable 140 to be flexed at an approximately 90 degree angle flush against the radio, as the radio is often worn in a radio pouch that does not have an opening to accommodate a flexible wire or cable. The design of the leads provides benefit over conventional leads and/or connectors that are rigid, wherein conventional rigid leads allow connection from one angle only and are prone to breakage if bumped.

In one embodiment, the flexible omnidirectional leads are attached to the universal DC power adaptor via a panel mount pass through. In a preferred embodiment, the panel mount pass through is formed of metal (e.g., aluminum). Alternatively, the flexible omnidirectional leads are attached to the universal DC power adaptor with a panel mount gasket. In one embodiment, the universal DC power adaptor includes the exterior gasket 230 and/or the interior gasket 232 to seal the universal DC power adaptor from environmental elements (e.g., dust, water). In one embodiment, the gasket is formed of silicone or rubber. In another embodiment, a layer of heat shrink tubing is placed around the wiring portion before the spring is placed around the wiring portion. The heat shrink tubing is preferably flexible. Advantageously, the heat shrink tubing provides additional waterproofing for the universal DC power adaptor.

In one embodiment, the flexible omnidirectional lead includes a dust cap 235. The dust cap 235 is configured to protect the input connector 135 from environmental elements (e.g., water, dust, dirt). In a preferred embodiment, the dust cap 235 is molded into a boot of the input connector 135. Advantageously, the input connector 135 is configured to operate after exposure to dirt, even if the dust cap 235 is removed. This allows for soldiers to continue to use the universal DC power adaptor in dirty and/or dusty environments.

In another embodiment, the adaptor plate assembly includes a second cable (e.g., flexible omnidirectional lead) and/or a connector on that is configured to connect to a second electronic device. In one embodiment, the second cable is on a same side as the first cable. In another embodiment, the second cable is on a different side (e.g., opposite side) than the first cable.

Figure 25:
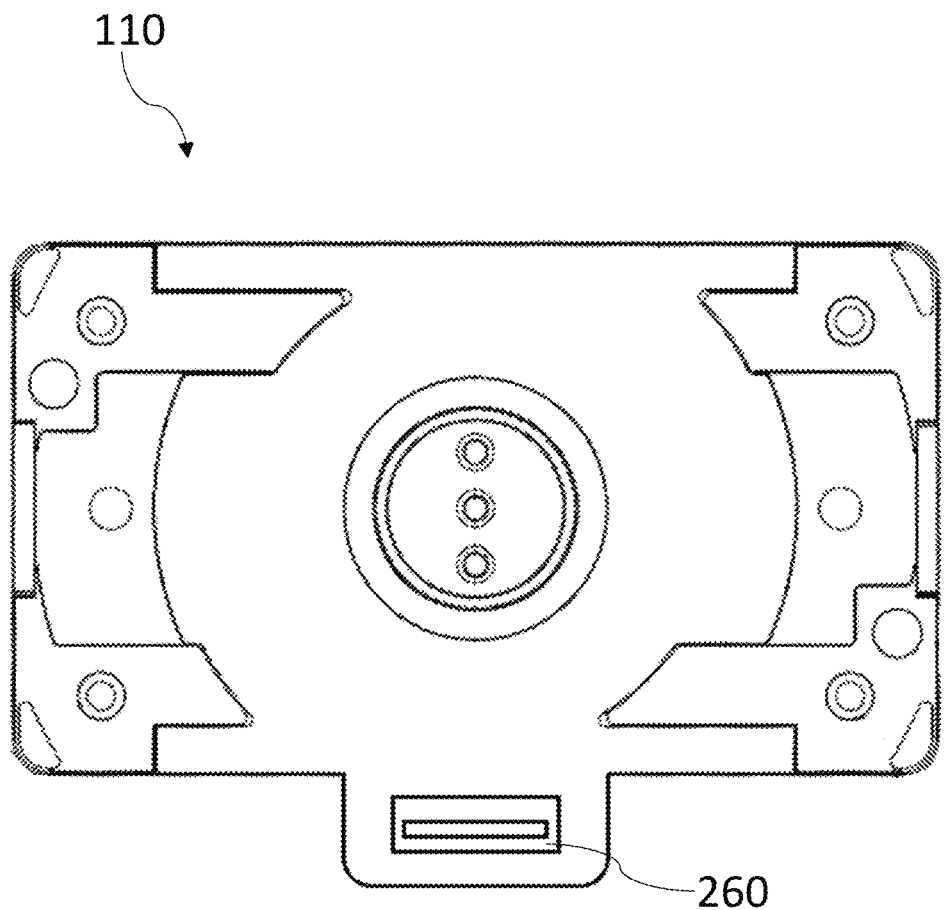
FIG. 25 illustrates an example of a universal DC power adaptor with a universal serial bus (USB) receptacle.

In one embodiment, the adaptor plate assembly includes a universal serial bus (USB) receptacle. In one embodiment, the USB receptacle is on an opposite side of the first cable in the adaptor plate assembly. In one embodiment, the USB receptacle is on a side of the adaptor plate assembly. In another embodiment, the USB receptacle 260 is positioned on a top side of the adaptor plate assembly 110 as shown in FIG. 25. The USB receptacle 260 is positioned such that it is not blocked when a radio is mated to the universal DC power adaptor. In one embodiment, the control electronics include a DC-DC converter that converts the input voltage to 5V for the USB receptacle.

Figure 26:
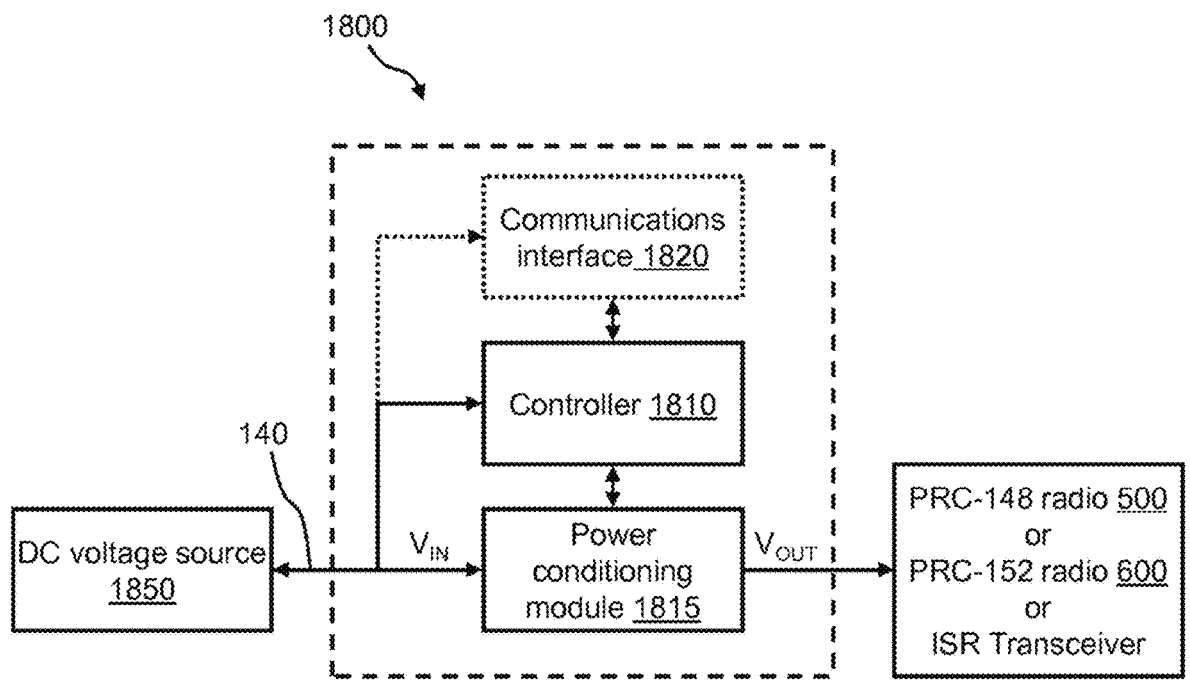
FIG. 26 illustrates a block diagram of an example of the control electronics of the universal DC power adaptor.

FIG. 26 illustrates a block diagram of control electronics 1800 of the universal DC power adaptor according to one embodiment of the present invention. The control electronics 1800 are implemented on the PCB using standard PCB technology. The control electronics 1800 include, for example, a controller 1810 and a power conditioning module 1815.

The controller 1810 can be any standard controller or microprocessor device that is capable of executing program instructions. The power conditioning module 1815 can be any power conditioning circuitry that receives a certain DC input voltage $V_{IN}$ within an expected input voltage range and generates a desired DC output voltage $V_{OUT}$. In one embodiment, the power conditioning module 1815 includes a DC-DC converter. In one embodiment, the DC-DC converter is operable to manage current fluctuations of the radio. Generally, a radio will need an increased current when powering on, transmitting, and/or connecting to a network. When the radio requires this additional current, the universal DC power adaptor has a current range operable to provide the radio with an amperage increase.

The input of the power conditioning module 1815 (i.e., the DC input voltage $V_{IN}$) is driven by an external DC voltage source 1850. The external DC voltage source 1850 can be any DC voltage source, such as, but not limited to, a non-rechargeable battery, a rechargeable battery (e.g., portable battery pack, NETT Warrior battery), and a DC power supply.

The DC output voltage $V_{OUT}$ of the power conditioning module 1815 drives either the PRC-152 radio 500 or the PRC-148 radio 600. The operating voltage of the PRC-152 radio 500 is from about 10 VDC (e.g., 10±0.5 VDC to about 14.5±0.5 VDC), whereas the operating voltage of the PRC-148 radio 600 is from about 10 VDC to about 16.3 VDC. Given that the two operating voltage are slightly different, in one embodiment, the DC output voltage $V_{OUT}$ of the universal DC power adaptor is a value that is within the range of the overlapping portions of the two operating voltages. For example, the DC output voltage $V_{OUT}$ of the universal DC power adaptor is limited to a range from about 10 VDC to about 14.5 VDC, which is the operating voltage range of the PRC-152 radio 500. In one example, the DC output voltage $V_{OUT}$ of the universal DC power adaptor is about 11.8±0.5 VDC. In another embodiment, the DC output voltage $V_{OUT}$ of the power conditioning module 1815 drives the PRC-152 radio, the PRC-161 radio, the PRC-163 radio, the SADL MicroLite (RT-1922) radio, the TacRover-E (TRE) radio, the Tactical ROVER-P (SIR 2.5) radio, the Coastal Defense MVR-IV video down link receiver, or the Persistent Systems Wave Relay MPU5 radio. In one embodiment, the $V_{OUT}$ is between about 9.6 VDC to about 34.3 VDC. Alternatively, the VO U T is between about 9 VDC to about 16 VDC. In yet another embodiment, the VO U T is about 8 VDC to about 28 VDC.

In another embodiment, the DC input voltage $V_{IN}$ of the universal DC power adaptor, which is supplied by the external DC voltage source 1850, can be, for example, from about 11.2 VDC±3% to about 17 VDC±3%. In this example, the power conditioning module 1815 converts the DC input voltage $V_{IN}$, which can range from about 11.2 VDC±3% to about 17 VDC±3%, to about 11.8±0.5 VDC. Because the DC input voltage $V_{IN}$ can vary, at certain times the power conditioning module 1815 is converting a lower input voltage to a higher output voltage, at others times the power conditioning module 1815 is converting a higher input voltage to a lower output voltage, and at yet others times the input voltage of the power conditioning module 1815 is substantially the same as the output voltage.

The controller 1810 and the power conditioning module 1815 of the control electronics 1800 are programmable. In the aforementioned example, the power conditioning module 1815 is programmed to receive from about 11.2 VDC±3% to about 17 VDC±3% and then generate about 11.8±0.5 VDC. In another embodiment, the power conditioning module 1815 is operable to receive from about 25 VDC±3% to about 30 VDC±3% and then generate about 11.8±0.5 VDC. The programmability of the universal DC power adaptor allows it to be used with different external DC voltage sources.

In one example, the input connector and the flexible wire or cable 140 is used as a communication link to the controller 1810 and/or the power conditioning module 1815. In another example, a separate wired input/output (I/O) port (not shown) is used as a communication link to the controller 1810 and/or the power conditioning module 1815. In yet another example, the control electronics 1800 includes a communications interface 1820. The communications interface 1820 includes any wired and/or wireless communication interface for connecting to a network (not shown) and by which information is exchanged with other devices (not shown) connected to the network. Examples of wired communication interfaces include, but are not limited to, USB ports, RS232 connectors, RJ45 connectors, Ethernet, and any combinations thereof. Examples of wireless communication interfaces include, but are not limited to, an Intranet connection, Internet, ISM, BLUETOOTH® technology, WI-FI, WI-MAX, IEEE 802.11 technology, radio frequency (RF), Infrared Data Association (IrDA) compatible protocols, Local Area Networks (LAN), Wide Area Networks (WAN), Shared Wireless Access Protocol (SWAP), any combinations thereof, and other types of wireless networking protocols.

Figure 27:
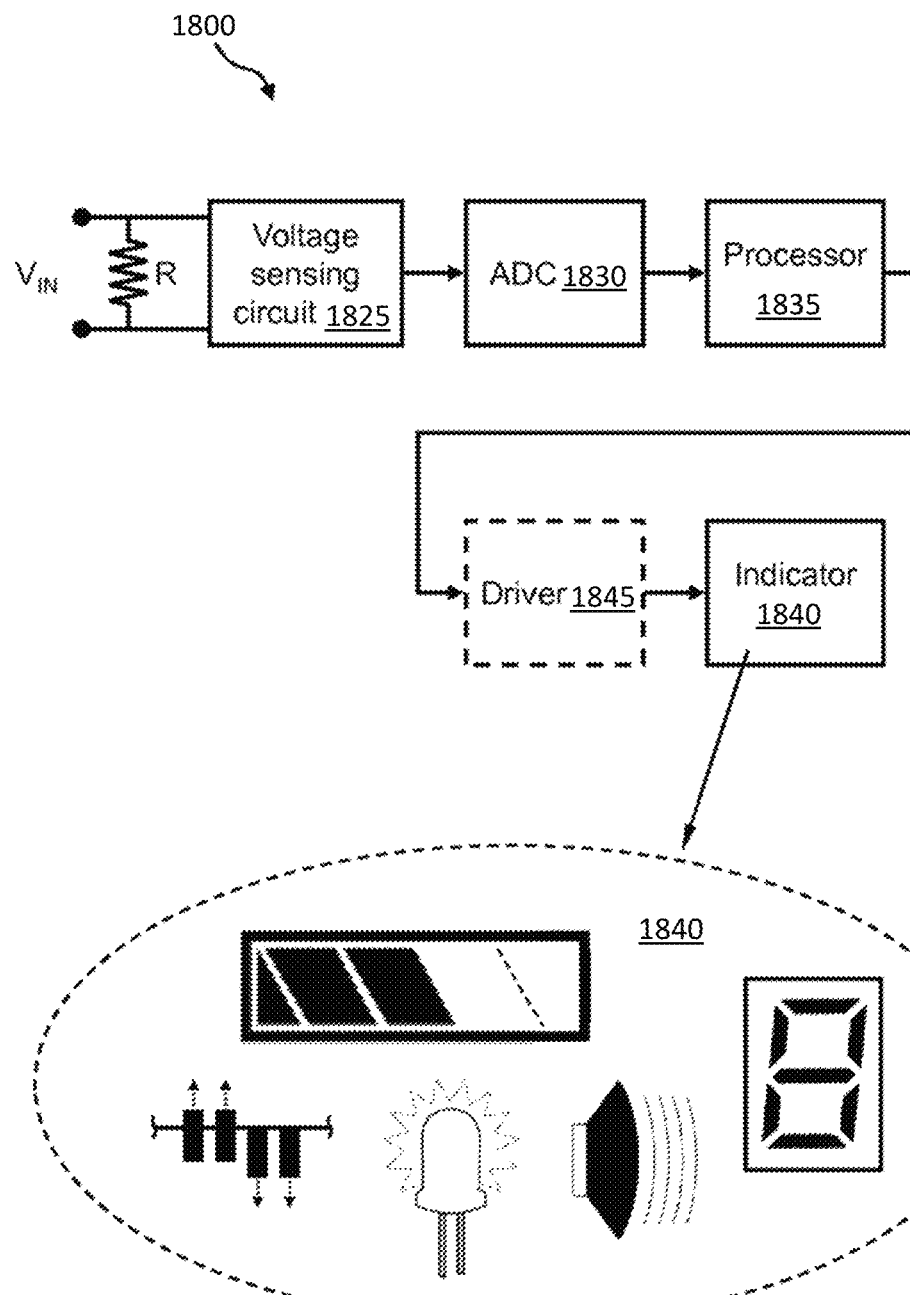
FIG. 27 illustrates a block diagram of one embodiment of the control electronics for a state of charge indicator incorporated into the universal DC power adaptor.

FIG. 27 illustrates a block diagram of one embodiment of the control electronics for a state of charge indicator incorporated into the universal DC power adaptor. In this example, the control electronics 1800 includes a voltage sensing circuit 1825, an analog-to-digital converter (ADC) 1830, a processor 1835, the indicator 1840, and optionally a driver 1845.

The voltage sensing circuit 1825 can be any standard voltage sensing circuit, such as those found in volt meters. An input voltage $V_{IN}$ is supplied via the power bus. In one embodiment, the voltage sensing circuit 1825 is designed to sense any direct current (DC) voltage in the range of from about 0 volts DC to about 50 volts DC. In one embodiment, the voltage sensing circuit 1825 includes standard amplification or de-amplification functions for generating an analog voltage that correlates to the amplitude of the input voltage $V_{IN}$ that is present. The ADC 1830 receives the analog voltage from the voltage sensing circuit 1825 and performs a standard analog-to-digital conversion.

The processor 1835 manages the overall operations of the SOC indicator. The processor 1835 is any controller, microcontroller, or microprocessor that is capable of processing program instructions.

The indicator 1840 is any visual, audible, or tactile mechanism for indicating the state of charge of an external DC power source mated to the universal DC power adaptor. A preferred embodiment of a visual indicator is at least one 5-bar liquid crystal display (LCD), wherein five bars flashing or five bars indicates greatest charge and one bar or one bar flashing indicates least charge. Another example of a visual indicator is at least one seven-segment numeric LCD, wherein the number 5 flashing or the number 5 indicates greatest charge and the number 1 or the number 1 flashing indicates least charge. Alternatively, the at least one LCD displays the voltage of the external DC power source mated to the universal DC power adaptor as measured by the control electronics.

The at least one LCD is preferably covered with a transparent material. In a preferred embodiment, the cover is formed of a clear plastic (e.g., poly(methyl methacrylate)). This provides an extra layer of protection for the at least one LCD, much like a screen protector provides an extra layer of protection for a smartphone. This increases the durability of the at least one LCD. The universal DC power adaptor includes a waterproof sealant (e.g., silicone) around the cover.

Alternatively, a visual indicator is at least one LED. One preferred embodiment of a visual indicator is a set of light-emitting diodes (LEDs) (e.g., 5 LEDs), wherein five lit LEDs flashing or five lit LEDs indicates greatest charge and one lit LED or one lit LED flashing indicates least charge. In one embodiment, the LEDs are red, yellow, and/or green. In one example, two of the LEDs are green to indicate a mostly full charge on the external DC power source mated to the universal DC power adaptor, two of the LEDs are yellow to indicate that charging and/or replacement will soon be required for the external DC power source mated to the universal DC power adaptor, and one LED is red to indicate that the external DC power source mated to the universal DC power adaptor is almost drained. In a preferred embodiment, at least three bars, lights, or numbers are used to indicate the state of charge.

In one embodiment, the at least one LED is preferably covered with a transparent material. In a preferred embodiment, the cover is formed of a clear plastic (e.g., poly(methyl methacrylate)). This provides an extra layer of protection for the at least one LED. This increases the durability of the at least one LED. The universal DC power adaptor includes a waterproof sealant (e.g., silicone) around the cover.

One example of an audible indicator is any sounds via an audio speaker, such as beeping sounds, wherein five beeps indicates greatest charge and one beep indicates least charge. Another example of an audible indicator is vibration sounds via any vibration mechanism (e.g., vibration motor used in mobile phones), wherein five vibration sounds indicates greatest charge and one vibration sound indicates least charge.

One example of a tactile indicator is any vibration mechanism (e.g., vibration motor used in mobile phones), wherein five vibrations indicate greatest charge and one vibration indicate least charge. Another example of a tactile indicator is a set of pins that rise up and down to be felt in Braille-like fashion, wherein five raised pins indicates greatest charge and one raised pin indicates least charge.

In one example, the processor 1835 is able to drive the indicator 1840 directly. In one embodiment, the processor 1835 is able to drive directly a 5-bar LCD or a seven-segment numeric LCD. In another example, however, the processor 1835 is not able to drive the indicator 1840 directly. In this case, the driver 1845 is provided, wherein the driver 1845 is specific to the type of indicator 1840 used in the control electronics 1800.

Additionally, the processor 1835 includes internal programmable functions for programming the expected range of the input voltage $V_{IN}$ and the correlation of the value of the input voltage $V_{IN}$ to what is indicated at the indicator 1840. In other words, the discharge curve of the external DC power source mated to the universal DC power adaptor can be correlated to what is indicated at the indicator 1840. In one embodiment, the processor 1835 is programmed based on a percent discharged or on an absolute value present at the input voltage $V_{IN}$.

As previously stated, in one embodiment, the control electronics 1800 include a communications interface, which allows the universal DC power adaptor to send information (e.g., state of charge information) to at least one remote device (e.g., smartphone, tablet, laptop computer, satellite phone) and/or receive information (e.g., software updates) from at least one remote device. The communications interface provides wireless communication, standards-based or non-standards-based, by way of example and not limitation, radiofrequency, BLUETOOTH, ZIGBEE, Near Field Communication, or similar commercially used standards.

Figure 28:
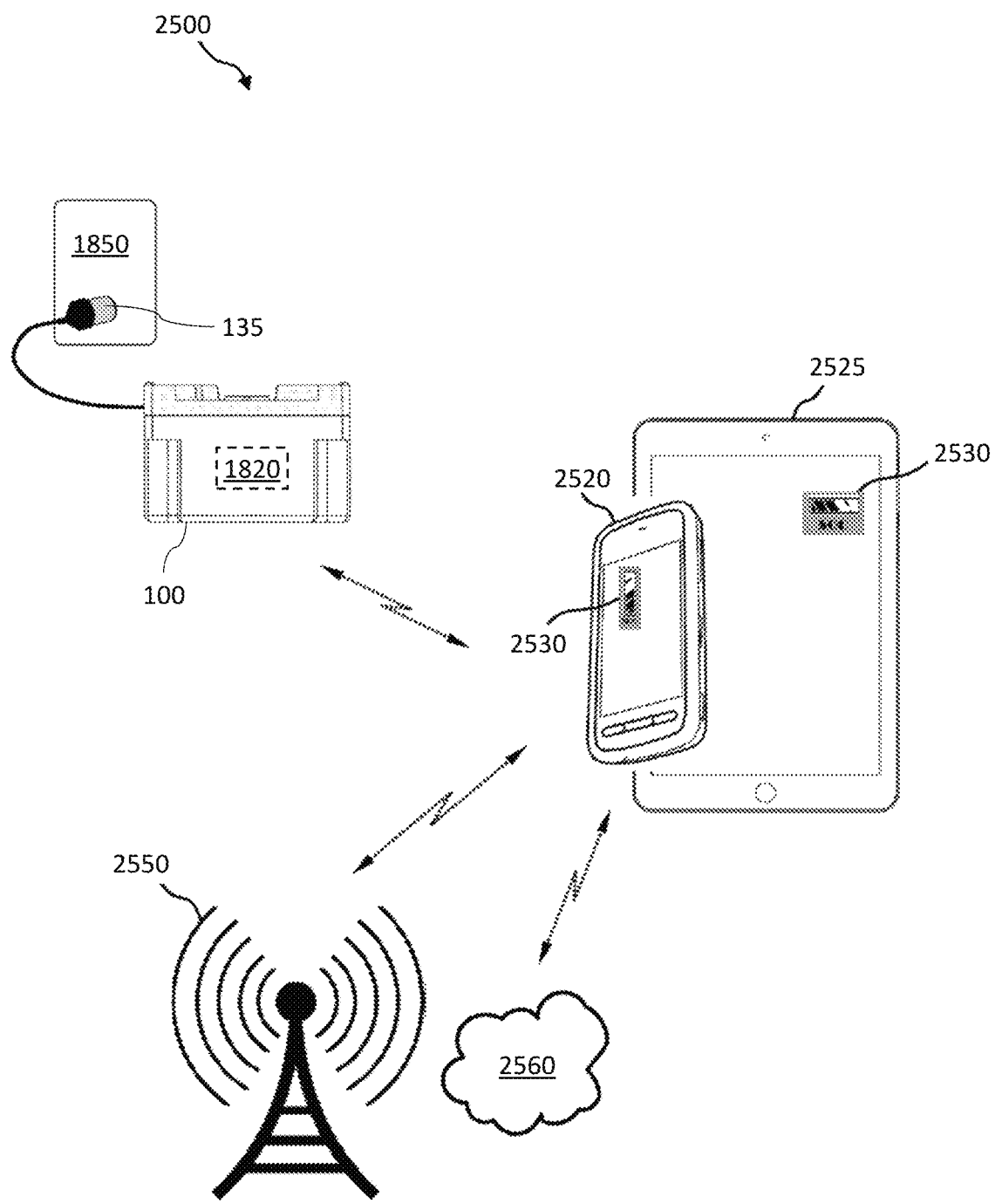
FIG. 28 illustrates a block diagram of an example of an SOC system that includes a mobile application for use with a universal DC power adaptor.

FIG. 28 illustrates a block diagram of an example of an SOC system 2500 that includes a mobile application for use with a universal DC power adaptor. The SOC system 2020 includes a universal DC power adaptor 100 having a communications interface 1820.

The communications interface 1820 is any wired and/or wireless communication interface for connecting to a network and by which information may be exchanged with other devices connected to the network. Examples of wired communication interfaces include, but are not limited to, USB ports, RS232 connectors, RJ45 connectors, Ethernet, and any combinations thereof. Examples of wireless communication interfaces include, but are not limited to, an Intranet connection, Internet, ISM, BLUETOOTH technology, WI-FI, WIMAX, IEEE 802.11 technology, radio frequency (RF), Near Field Communication (NFC), ZIGBEE, Infrared Data Association (IrDA) compatible protocols, Local Area Networks (LAN), Wide Area Networks (WAN), Shared Wireless Access Protocol (SWAP), any combinations thereof, and other types of wireless networking protocols.

The communications interface 1820 is used to communicate, preferably wirelessly, with at least one remote device, such as but not limited to, a mobile phone 2520 or a tablet 2525. The mobile phone 2520 can be any mobile phone that (1) is capable of running mobile applications and (2) is capable of communicating with the universal DC power adaptor 100. The mobile phone 2520 can be, for example, an ANDROID phone, an APPLE IPHONE, or a SAMSUNG GALAXY phone. Likewise, the tablet 2525 can be any tablet that (1) is capable of running mobile applications and (2) is capable of communicating with the universal DC power adaptor 100. The tablet 2525 can be, for example, the 3G or 4G version of the APPLE IPAD.

Further, in SOC system 2500, the mobile phone 2520 and/or the tablet 2525 is in communication with a cellular network 2550 and/or a network 2560. The network 2560 can be any network for providing wired or wireless connection to the Internet, such as a local area network (LAN) or a wide area network (WAN).

An SOC mobile application 2530 is installed and running at the mobile phone 2520 and/or the tablet 2525. The SOC mobile application 2530 is implemented according to the type (i.e., the operating system) of mobile phone 2520 and/or tablet 2525 on which it is running. The SOC mobile application 2530 is designed to receive SOC information from the universal DC power adaptor 100. The SOC mobile application 2530 indicates graphically, audibly, and/or tactilely, the state of charge to the user (not shown).

Figure 29:
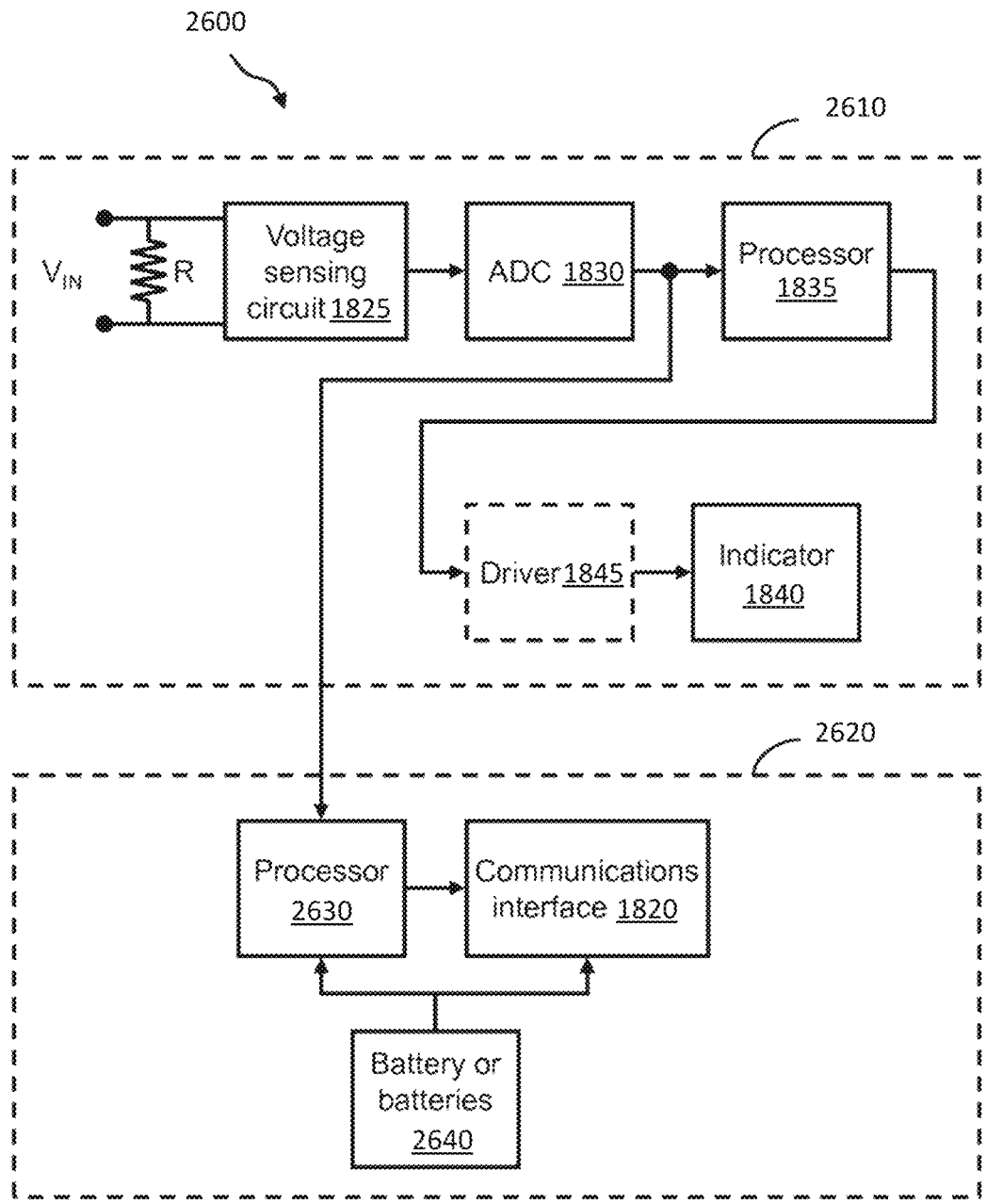
FIG. 29 illustrates a block diagram of an example of control electronics of the universal DC power adaptor that is capable of communicating with the SOC mobile application.

FIG. 29 illustrates a block diagram of an example of SOC system 2600 of the universal DC power adaptor that is capable of communicating with the SOC mobile application. In this example, the SOC system 2600 includes an SOC portion 2610 and a communications portion 2620. The SOC portion 2610 is substantially the same as the control electronics 1800 shown in FIG. 27. The communications portion 2620 handles the communication of the SOC information to the SOC mobile application at, for example, the mobile phone and/or the tablet.

The communications portion 2620 includes a communications processor 2630 that is communicatively connected to the communications interface 1820. The digital output of the ADC 1830 of the SOC portion 2610, which is the SOC information, feeds an input to the processor 1935. The processor 1835 can be any controller, microcontroller, or microprocessor that is capable of processing program instructions. One or more batteries 2640 provide power to the communications processor 2630 and the communications interface 1820. The one or more batteries 2640 can be any standard cylindrical battery, such as quadruple-A, triple-A, or double-A, or a battery from the family of button cell and coin cell batteries. A specific example of a battery 2640 is the CR2032 coin cell 3-volt battery.

In SOC system 2600, the SOC portion 2610 and the communications portion 2620 operate substantially independent of one another. Namely, the communications portion 2620 is powered separately from the SOC portion 2610 so that the communications portion 2620 is not dependent on the presence of the input voltage $V_{IN}$ at the SOC portion 2610 for power. Therefore, in this example, the communications portion 2620 is operable to transmit information to the SOC mobile application at any time. However, in order to conserve battery life, in one embodiment the processor 2620 is programmed to be in sleep mode when no voltage is detected at the input voltage $V_{IN}$ at the SOC portion 2610 and to wake up when an input voltage $V_{IN}$ is detected. Alternatively, the processor 2610 is programmed to periodically measure the SOC and send SOC information to the SOC mobile application on the at least one remote device periodically, such as every hour, regardless of the state of input voltage $V_{IN}$.

Figure 30:
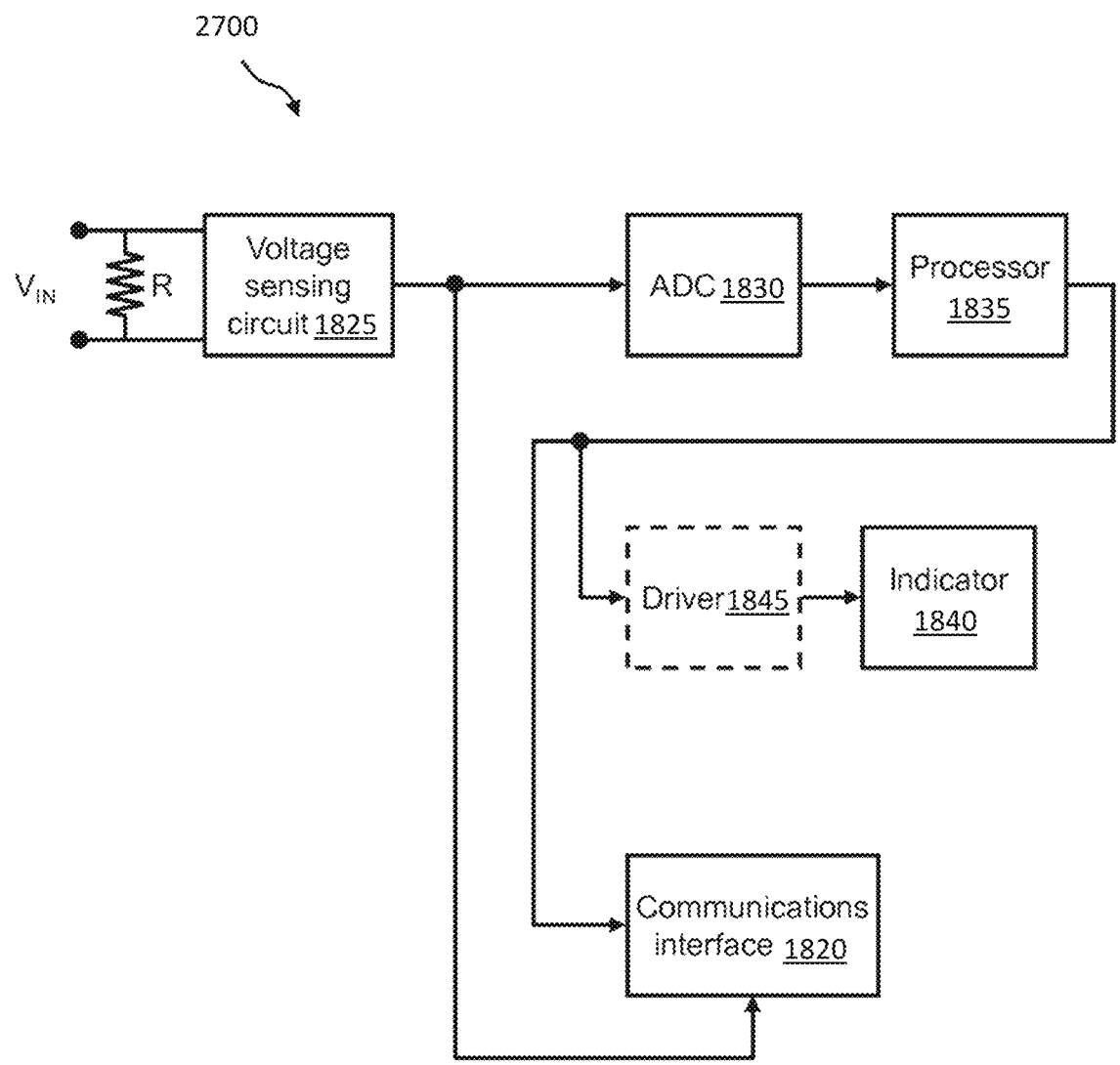
FIG. 30 illustrates a block diagram of another example of control electronics of the universal DC power adaptor that is capable of communicating with the SOC mobile application.

FIG. 30 illustrates a block diagram of another example of control electronics 2700 of the universal DC power adaptor that is capable of communicating with the SOC mobile application. In this example, the operation of the communications interface 1820 is dependent on the presence of a voltage at input voltage $V_{IN}$. This is because, in control electronics 2700, the communications interface 1820 is powered from the output of voltage sensing circuit 1825. Further, the processor 1835 provides the input (i.e., the SOC information) to the communications interface 1820. A drawback of the control electronics 2700 of FIG. 30 as compared with the SOC system 2600 of FIG. 26, is that it is operable to transmit SOC information to the SOC mobile application only when the external DC power source mated to the universal DC power adaptor has a charge.

In another embodiment, the universal DC power adaptor is operable to interface with software on the radio to provide a state of charge of the external DC power source. In one embodiment, the radio includes a system management bus (SMBus) protocol. In one embodiment, the universal DC power adaptor is operable to transmit state of charge information to the radio via the center pin of the voltage output pins.

Figure 31:
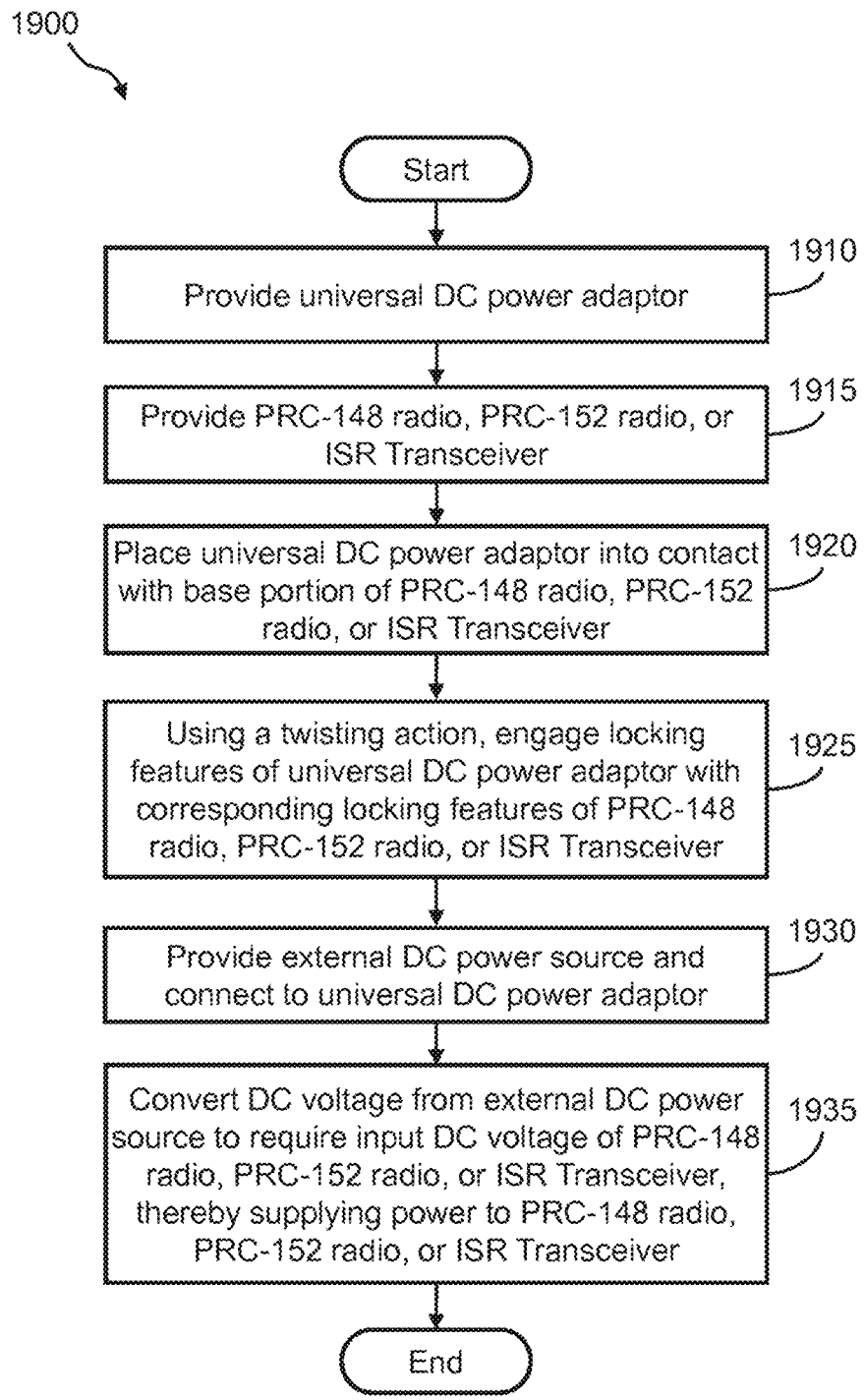
FIG. 31 illustrates a flow diagram of an example of a method of using the universal DC power adaptor for the Handheld ISR Transceiver, PRC-148 radio, and PRC-152 radio.

FIG. 31 illustrates a flow diagram of an example of a method 1900 of using the universal DC power adaptor for either the PRC-148 radio or the PRC-152 radio. The method 1900 includes, but is not limited to, the following steps.

The first step 1910 includes providing a universal DC power adaptor.

The second step 1915 includes providing the PRC-148 radio or the PRC-152 radio without its standard rechargeable battery.

The third step 1920 including placing the universal DC power adaptor into contact with the base portion of the PRC-148 radio or the PRC-152 radio.

During the fourth step 1925, using a twisting action, the locking features of the universal DC power adaptor engage with the corresponding locking features of the PRC-148 radio or the PRC-152 radio. In one example, using a twisting action, the first end and the second end of the mating plate of the PRC-152 radio are engaged with the respective edges of the two mating plates of the universal DC power adaptor. Further, the movable locking clip of the PRC-152 radio is engaged with one of the two side locking features of the universal DC power adaptor. In another example, using a twisting action, the first end and the second end of the mating plate of the PRC-148 radio are engaged with the respective edges of the two mating plates of the universal DC power adaptor. Further, the spring-loaded button key of the PRC-148 radio is engaged with one of the two holes or detents of the universal DC power adaptor. In so doing, the voltage output pins of the universal DC power adaptor are mechanically and electrically coupled to the voltage input pins of the PRC-148 radio or the voltage input pins of the PRC-152 radio.

During the fifth step 1930, an external DC power source is provided and electrically coupled to the input of the universal DC power adaptor. In one embodiment, the input connector of the universal DC power adaptor is connected to a mating connector of the external DC voltage source.

During the sixth step 1935, the DC input voltage $V_{IN}$ is received at the input of the power conditioning module and then converted to the required DC output voltage $V_{OUT}$. In one example, the power conditioning module converts a DC input voltage $V_{IN}$ of from about 11.2 VDC±3% to about 17 VDC±3% to a DC output voltage $V_{OUT}$ of about 11.8±0.5 VDC. The power adaptor is operable to supplied to the DC output voltage to the PRC-148 radio or the PRC-152 radio.

Figure 32:
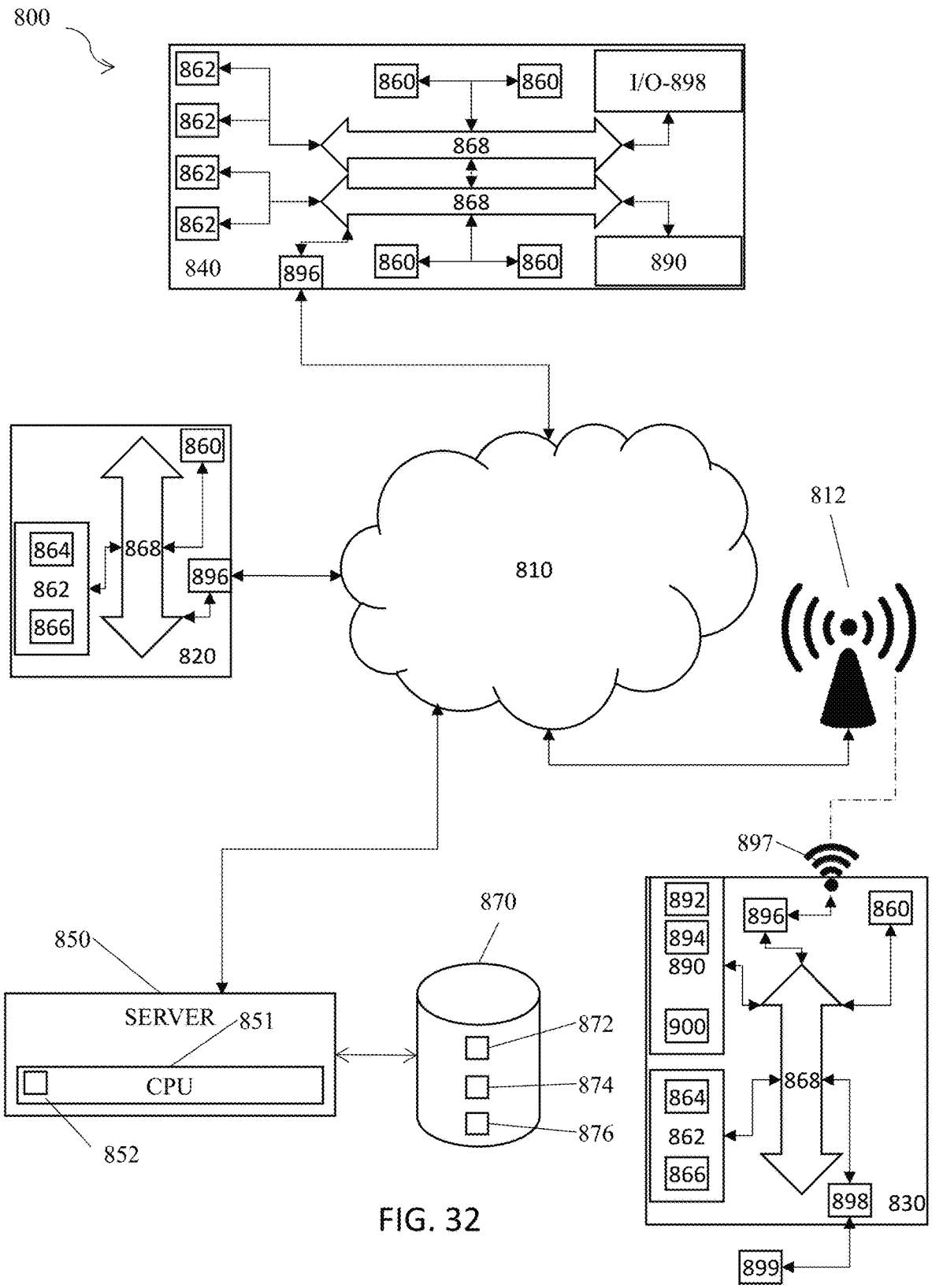
FIG. 32 is a schematic diagram of a system of the present invention.

FIG. 32 is a schematic diagram of an embodiment of the invention illustrating a computer system, generally described as 800, having a network 810, a plurality of computing devices 820, 830, 840, a server 850, and a database 870.

The server 850 is constructed, configured, and coupled to enable communication over a network 810 with a plurality of computing devices 820, 830, 840. The server 850 includes a processing unit 851 with an operating system 852. The operating system 852 enables the server 850 to communicate through network 810 with the remote, distributed user devices. Database 870 is operable to house an operating system 872, memory 874, and programs 876.

In one embodiment of the invention, the system 800 includes a network 810 for distributed communication via a wireless communication antenna 812 and processing by at least one mobile communication computing device 830. Alternatively, wireless and wired communication and connectivity between devices and components described herein include wireless network communication such as WI-FI, WORLDWIDE INTEROPERABILITY FOR MICROWAVE ACCESS (WIMAX), Radio Frequency (RF) communication including RF identification (RFID), NEAR FIELD COMMUNICATION (NFC), BLUETOOTH including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In another embodiment of the invention, the system 800 is a virtualized computing system capable of executing any or all aspects of software and/or application components presented herein on the computing devices 820, 830, 840. In certain aspects, the computer system 800 is operable to be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of electronic devices including at least a processor and a memory, such as a server, blade server, mainframe, mobile phone, personal digital assistant (PDA), smartphone, desktop computer, netbook computer, tablet computer, workstation, laptop, and other similar computing devices. The components shown here, their connections and relationships, and their functions, are meant to be exemplary only, and are not meant to limit implementations of the invention described and/or claimed in the present application.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 is operable to additionally include components such as a storage device 890 for storing the operating system 892 and one or more application programs 894, a network interface unit 896, and/or an input/output controller 898. Each of the components is operable to be coupled to each other through at least one bus 868. The input/output controller 898 is operable to receive and process input from, or provide output to, a number of other devices 899, including, but not limited to, alphanumeric input devices, mice, electronic styluses, display units, touch screens, signal generation devices (e.g., speakers), or printers.

By way of example, and not limitation, the processor 860 is operable to be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 32, multiple processors 860 and/or multiple buses 868 are operable to be used, as appropriate, along with multiple memories 862 of multiple types (e.g., a combination of a DSP and a microprocessor, a plurality of microprocessors, one or more microprocessors in conjunction with a DSP core).

Also, multiple computing devices are operable to be connected, with each device providing portions of the necessary operations (e.g., a server bank, a group of blade servers, or a multi-processor system). Alternatively, some steps or methods are operable to be performed by circuitry that is specific to a given function.

According to various embodiments, the computer system 800 is operable to operate in a networked environment using logical connections to local and/or remote computing devices 820, 830, 840 through a network 810. A computing device 830 is operable to connect to a network 810 through a network interface unit 896 connected to a bus 868. Computing devices are operable to communicate communication media through wired networks, direct-wired connections or wirelessly, such as acoustic, RF, or infrared, through an antenna 897 in communication with the network antenna 812 and the network interface unit 896, which are operable to include digital signal processing circuitry when necessary. The network interface unit 896 is operable to provide for communications under various modes or protocols.

In one or more exemplary aspects, the instructions are operable to be implemented in hardware, software, firmware, or any combinations thereof. A computer readable medium is operable to provide volatile or non-volatile storage for one or more sets of instructions, such as operating systems, data structures, program modules, applications, or other data embodying any one or more of the methodologies or functions described herein. The computer readable medium is operable to include the memory 862, the processor 860, and/or the storage media 890 and is operable be a single medium or multiple media (e.g., a centralized or distributed computer system) that store the one or more sets of instructions 900. Non-transitory computer readable media includes all computer readable media, with the sole exception being a transitory, propagating signal per se. The instructions 900 are further operable to be transmitted or received over the network 810 via the network interface unit 896 as communication media, which is operable to include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory, or other solid state memory technology; discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that can be used to store the computer readable instructions and which can be accessed by the computer system 800.

In one embodiment, the computer system 800 is within a cloud-based network. In one embodiment, the server 850 is a designated physical server for distributed computing devices 820, 830, and 840. In one embodiment, the server 850 is a cloud-based server platform. In one embodiment, the cloud-based server platform hosts serverless functions for distributed computing devices 820, 830, and 840.

In another embodiment, the computer system 800 is within an edge computing network. The server 850 is an edge server, and the database 870 is an edge database. The edge server 850 and the edge database 870 are part of an edge computing platform. In one embodiment, the edge server 850 and the edge database 870 are designated to distributed computing devices 820, 830, and 840. In one embodiment, the edge server 850 and the edge database 870 are not designated for distributed computing devices 820, 830, and 840. The distributed computing devices 820, 830, and 840 connect to an edge server in the edge computing network based on proximity, availability, latency, bandwidth, and/or other factors.

It is also contemplated that the computer system 800 is operable to not include all of the components shown in FIG. 32, is operable to include other components that are not explicitly shown in FIG. 32, or is operable to utilize an architecture completely different than that shown in FIG. 32. The various illustrative logical blocks, modules, elements, circuits, and algorithms described in connection with the embodiments disclosed herein are operable to be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

The above-mentioned examples are provided to serve the purpose of clarifying the aspects of the invention, and it will be apparent to one skilled in the art that they do not serve to limit the scope of the invention. By nature, this invention is highly adjustable, customizable and adaptable. The above-mentioned examples are just some of the many configurations that the mentioned components can take on. All modifications and improvements have been deleted herein for the sake of conciseness and readability but are properly within the scope of the present invention.

The invention claimed is:

1. A direct current (DC) power adaptor comprising:
   an adaptor plate assembly;
   an adaptor housing; and
   a layer of heat-shielding or blocking, heat-dissipating and/or heat signature-reducing material;
   wherein the adaptor plate assembly includes an adaptor plate, at least one input connector, and at least one voltage pin;
   wherein the adaptor plate assembly is attached to the adaptor housing;
   wherein the adaptor housing includes control electronics electrically connected to the at least one voltage pin;
   wherein the control electronics are electrically connected to the at least one input connector;
   wherein the at least one input connector is configured to connect to a DC power source; and
   wherein the layer of heat-shielding or blocking, heat-dissipating and/or heat signature-reducing material is functionally positioned between the adaptor plate assembly and the control electronics.

2. The DC power adaptor of claim 1, wherein the at least one input connector is a locking connector.

3. The DC power adaptor of claim 1, further including a gasket, wherein the gasket is positioned between the adaptor housing and the adaptor plate assembly.

4. The DC power adaptor of claim 1, wherein the control electronics include an isolator.

5. The DC power adaptor of claim 1, further including at least one flexible omnidirectional lead, wherein the at least one flexible omnidirectional lead includes the at least one input connector and at least one cable, wherein a flexible spring is provided around the at least one cable, wherein the at least one cable and the flexible spring are held securely in the adaptor plate assembly such that a portion of the flexible spring is positioned inside the adaptor plate assembly and a portion of the flexible spring is positioned outside the adaptor plate assembly.

6. The DC power adaptor of claim 1, wherein the adaptor plate assembly includes a universal serial bus (USB) receptacle.

7. The DC power adaptor of claim 1, wherein the adaptor plate assembly is formed of a glass fiber reinforced resin.

8. The DC power adaptor of claim 1, wherein the adaptor plate assembly includes at least one hole.

9. The DC power adaptor of claim 1, wherein the control electronics include a power conditioning module, wherein the power conditioning module is configured to receive an input voltage, and wherein the power conditioning module is further configured to supply an output voltage.

10. The DC power adaptor of claim 9, wherein the output voltage is within a range of about 10 VDC to about 14.5 VDC.

11. The DC power adaptor of claim 9, wherein the input voltage has a range from about 11.2 VDC±3% to about 17 VDC±3% or about 25 VDC±3% to about 30 VDC±3%.

12. The DC power adaptor of claim 1, further including at least one indicator for indicating a state of charge of the DC power source.

13. The DC power adaptor of claim 1, wherein the control electronics include a voltage sensing circuit and a communications interface configured to communicate information related to a state of charge of the DC power source to a network.

14. A direct current (DC) power adaptor comprising:
an adaptor plate assembly;
an adaptor housing; and
a layer of heat-shielding or blocking, heat-dissipating and/or heat signature-reducing material;
wherein the adaptor plate assembly includes an adaptor plate, at least one input connector, and at least one voltage pin;
wherein the adaptor housing includes control electronics, wherein the control electronics include a printed circuit board (PCB) and a power conditioning module, and wherein the PCB is electrically connected to the at least one voltage pin;
wherein the PCB is electrically connected to the at least one input connector;
wherein the power conditioning module is configured to receive an input voltage, and wherein the power conditioning module is further configured to supply an output voltage;
wherein the at least one input connector is configured to connect to a DC power source; and
wherein the layer of heat-shielding or blocking, heat-dissipating and/or heat signature-reducing material is functionally positioned between the adaptor plate assembly and the control electronics.

15. The DC power adaptor of claim 14, wherein the output voltage is within a range of about 10 VDC to about 14.5 VDC.

16. The DC power adaptor of claim 14, wherein the input voltage has a range from about 11.2 VDC±3% to about 17 VDC±3%.

17. The DC power adaptor of claim 14, wherein the input voltage has a range from about 25 VDC±3% to about 30 VDC±3%.

18. A direct current (DC) power adaptor comprising:
an adaptor plate assembly;
an adaptor housing; and
a layer of heat-shielding or blocking, heat-dissipating and/or heat signature-reducing material;
wherein the adaptor plate assembly includes an adaptor plate and, at least one input connector;
wherein the adaptor plate assembly is attached to the adaptor housing;
wherein the adaptor housing includes control electronics, wherein the control electronics are electrically connected to at least one voltage pin;
wherein the control electronics include a communications interface;
wherein the at least one input connector is configured to connect to a DC power source;
wherein the communications interface is configured to communicate information related to a state of charge of the DC power source; and
wherein the layer of heat-shielding or blocking, heat-dissipating and/or heat signature-reducing material is functionally positioned between the adaptor plate assembly and the control electronics.

19. The DC power adaptor of claim 18, further including at least one flexible omnidirectional lead, wherein the at least one flexible omnidirectional lead includes the at least one input connector and at least one cable, wherein a flexible spring is provided around the at least one cable, wherein the at least one cable and the flexible spring are held securely in the adaptor plate assembly such that a portion of the flexible spring is positioned inside the adaptor plate assembly and a portion of the flexible spring is positioned outside the adaptor plate assembly.

20. The DC power adaptor of claim 18, wherein the at least one input connector is a locking connector.

* * * * *